US012283474B2

(12) United States Patent
Bloomfield et al.

(10) Patent No.: US 12,283,474 B2
(45) Date of Patent: Apr. 22, 2025

(54) DYNAMICALLY CONCENTRATING ION PACKETS IN THE EXTRACTION REGION OF A TOF MASS ANALYZER IN TARGETED ACQUISITION

(71) Applicant: DH TECHNOLOGIES DEVELOPMENT PTE. LTD., Singapore (SG)

(72) Inventors: Nicholas G. Bloomfield, Newmarket (CA); Igor Chernushevich, Toronto (CA); Robert Haufler, Toronto (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 0 days.

(21) Appl. No.: 16/980,956

(22) PCT Filed: Apr. 10, 2019

(86) PCT No.: PCT/IB2019/052963

§ 371 (c)(1), (2) Date: Sep. 15, 2020

(87) PCT Pub. No.: WO2019/198010

PCT Pub. Date: Oct. 17, 2019

(65) Prior Publication Data

US 2021/0366701 A1 Nov. 25, 2021

Related U.S. Application Data

(60) Provisional application No. 62/655,527, filed on Apr. 10, 2018.

(51) Int. Cl.

*H01J 49/40* (2006.01)
*H01J 49/00* (2006.01)
(Continued)

(52) U.S. Cl.

CPC ........ *H01J 49/403* (2013.01); *H01J 49/0031* (2013.01); *H01J 49/0036* (2013.01);
(Continued)

(58) Field of Classification Search

CPC ............................................. H01J 49/00–4265
(Continued)

(56) References Cited

U.S. PATENT DOCUMENTS 7,456,388 B2 * 11/2008 Loboda ................. H01J 49/062 250/396 R
9,513,232 B2 * 12/2016 Cox .................... H01J 49/0031
(Continued)

FOREIGN PATENT DOCUMENTS

JP 2010538437 A 12/2010
JP 2014502725 A 2/2014
(Continued)

OTHER PUBLICATIONS

International Search Report and Written Opinion for PCT/IB2019/052963, mailed Aug. 13, 2019.
(Continued)

*Primary Examiner* — David E Smith
(74) *Attorney, Agent, or Firm* — Potomac Law Group, PLLC; Reza Mollaaghababa; Ido Rabinovitch

(57) ABSTRACT

Systems and methods are disclosed for dynamically switching an ion guide and a TOF mass analyzer between concentrating or not concentrating ions in a targeted acquisition. Product ions are ejected from the ion guide into the TOF mass analyzer and the intensity of a known product ion is measured at two or more time steps. The ion guide initially ejects product ions using a sequential or Zeno pulsing mode that concentrates product ions with different m/z values within the TOF mass analyzer at the same time. If the intensity of the product ion is increasing and greater than a
(Continued)

threshold intensity, the ion guide switches to a continuous or normal pulsing mode that does not concentrate ions with different m/z values in the TOF mass analyzer at the same time. Similarly, if the intensity decreases below a threshold in continuous mode, the ion guide switches back to sequential mode.

17 Claims, 13 Drawing Sheets

(51) Int. Cl.
*H01J 49/06* (2006.01)
*H01J 49/42* (2006.01)

(52) U.S. Cl.
CPC ........ *H01J 49/0045* (2013.01); *H01J 49/062* (2013.01); *H01J 49/067* (2013.01); *H01J 49/429* (2013.01)

(58) Field of Classification Search
USPC .......................................................... 250/287
See application file for complete search history.

(56) References Cited

U.S. PATENT DOCUMENTS

| | | | | |
|---|---|---|---|---|
| 9,734,995 | B2 * | 8/2017 | Green | G01N 27/623 |
| 10,727,036 | B2 * | 7/2020 | Richardson | H01J 49/004 |
| 2005/0247872 | A1 * | 11/2005 | Loboda | H01J 49/062 250/288 |
| 2007/0284521 | A1 * | 12/2007 | Green | H01J 49/06 250/281 |
| 2013/0035867 | A1 | 2/2013 | De et al. | |
| 2013/0181125 | A1 | 7/2013 | Guna et al. | |
| 2013/0289894 | A1 | 10/2013 | Cox et al. | |
| 2014/0319336 | A1 | 10/2014 | Aiello | |
| 2016/0027628 | A1 * | 1/2016 | Green | H01J 49/0036 250/281 |
| 2016/0209361 | A1 * | 7/2016 | Bloomfield | H01J 49/40 |
| 2017/0011899 | A1 * | 1/2017 | Moulds | G01N 27/622 |
| 2017/0221692 | A1 | 8/2017 | Baba | |
| 2020/0152441 | A1 * | 5/2020 | Furuhashi | H01J 49/063 |

FOREIGN PATENT DOCUMENTS

| | | | |
|---|---|---|---|
| JP | 2016526168 | A | 9/2016 |
| KR | 10-0816081 | B1 | 3/2008 |
| WO | 2009030900 | A2 | 3/2009 |
| WO | 2012090046 | A1 | 7/2012 |
| WO | 2014195734 | A1 | 12/2014 |
| WO | 2017178835 | A1 | 10/2017 |

OTHER PUBLICATIONS

Loboda et al., "A Novel Ion Trap That Enables High Duty Cycle and Wide m/z Range on an Orthogonal Injection TOF Mass Spectrometer", American Society for Mass Spectrometry, vol. 20, No. 7, pp. 1342-1348, Jul. 1, 2009.

Office Action for Chinese Patent Application No. 201980025020 issued on Jun. 28, 2024 (includes English language translation).

Office Action for Japanese Patent Application No. 2020-555108 issued on Feb. 16, 2024 (includes English language translation).

Supplementary European Search Report for European Application No. 19784339.4 dated Dec. 2, 2021.

* cited by examiner

DYNAMICALLY CONCENTRATING ION PACKETS IN THE EXTRACTION REGION OF A TOF MASS ANALYZER IN TARGETED ACQUISITION

RELATED APPLICATIONS

This application claims the benefit of U.S. Provisional Patent Application Ser. No. 62/655,527, filed on Apr. 10, 2018, the content of which is incorporated by reference herein in its entirety.

FIELD

The present application relates generally to mass spectrometry. In particular, the present application relates to concentrating ion packets for analysis by a mass spectrometer.

BACKGROUND

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

LC-MS and LC-MS/MS Background

The combination of mass spectrometry (MS) (or mass spectrometry/mass spectrometry (MS/MS)) and liquid chromatography (LC) is an important analytical tool for identification and quantification of compounds within a mixture. Generally, in liquid chromatography, a fluid sample under analysis is passed through a column filled with a solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis to generate an extracted ion chromatogram (XIC) or LC peak, which can depict detected ion intensity (a measure of the number of detected ions, total ion intensity or of one or more particular analytes) as a function of elution or retention time.

In some cases, the LC effluents can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. The selected precursor ions can then be fragmented (e.g., via collision induced dissociation), and the fragmented ions (product ions) can be analyzed via a subsequent stage of mass spectrometry.

Tandem Mass Spectrometry Acquisition Methods

A large number of different types of experimental acquisition methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined or known for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS can be repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

Ion Guide for Concentrating Ion Packets

U.S. Pat. No. 7,456,388 (hereinafter the "'388 patent") issued on Nov. 25, 2008, and incorporated herein by reference, describes an ion guide for concentrating on packets. The '388 patent provides apparatus and methods that allow, for example, analysis of ions over broad m/z ranges with virtually no transmission losses. The ejection of ions from an ion guide is affected by creating conditions where all ions (regardless of m/z) may be made to arrive at a designated point in space, such as for example an extraction region or accelerator of a TOF mass analyzer, in a desired sequence or at a desired time and with roughly the same energy. Ions bunched in such a way can then be manipulated as a group, as for example by being extracted using a TOF extraction pulse and propelled along a desired path in order to arrive at the same spot on a TOF detector.

To make heavier and lighter ions with the same energy meet at a point in space such as the extraction region of a mass analyzer at substantially the same time, heavier ions can be ejected from the ion guide before lighter ions. Heavier ions of a given charge travel more slowly in an electromagnetic field than lighter ions of the same charge, and therefore can be made to arrive at the extraction region or other point at the same time as, or at a selected interval with respect to, the lighter ions if released within a field in a desired sequence. The '388 patent provides mass-correlated ejection of ions from the ion guide in a desired sequence.

FIG. 2 is an exemplary schematic diagram 200 of a mass spectrometer. The mass spectrometer of FIG. 2 is described in the '388 patent, for example. Apparatus 30 comprises a mass spectrometer including ion source 20, ion guide 24, and TOF mass analyzer 28. Ion source 20 can include any type of source compatible with the purposes described herein, including for example sources which provide ions through electrospray ionization (ESI), matrix-assisted laser desorption ionization (MALDI), ion bombardment, application of electrostatic fields (e.g., field ionization and field desorption), chemical ionization, etc.

Ions from ion source 20 may be passed into an ion manipulation region 22, where ions can be subjected to ion beam focusing, ion selection, ion ejection, ion fragmentation, ion trapping, or any other generally known forms of ion analysis, ion chemistry reaction, ion trapping or ion transmission. Ions so manipulated can exit the manipulation region 22 and pass into an ion guide indicated by 24.

Ion guide 24 defines axis 174 and comprises inlet 38, exit 42 and exit aperture 46. Ion guide 24 is adapted to generate or otherwise provide an ion control field comprising a component for restraining movement of ions in directions normal to the guide axis and a component for controlling the movement of ions parallel to the guide axis.

Ion guide 24 may include multiple sections or portions and/or auxiliary electrodes. As will be explained in greater detail below, ion guide 24 of spectrometer 30 is operable to eject ions of different masses and/or m/z ratios from exit 42, while maintaining radial confinement along axis 174 within and beyond the ion guide 24, such that the ions arrive at a desired point substantially along the axis of the ion guide, or in a desired proximity thereto, such as within extraction region 56 of TOF mass analyzer 28, adjacent to push plate 54, at substantially the same time, or in a desired sequence.

Ions ejected from ion guide 24 can be focused or otherwise processed by further apparatus, as for example electrostatic lens 26 (which may be considered a part of guide 24) and/or mass analyzer 28. Spectrometer 30 can also include devices such as push plate 54 and accelerating column 55, which may, for example, be part of an extraction mechanism of mass analyzer 28.

FIG. 3 is an exemplary schematic diagram 300 of the ion guide, electrostatic lens, and mass analyzer of the '388 patent along with an accumulation potential profile of the ion guide. Accumulation potential profile 58 of FIG. 3 represents relative potential values, such as voltages or pressures, provided along axis 174 of ion guide 24. The relative potential at portion 34*a* of ion guide 24 is indicated at 90, the potential provided at portions 34*b* and 34*c* at 91, and the potential gradient provided across portion 34*c* of the ion guide 24 and exit 42 of aperture 46 at 92. Although not shown, an RF voltage is applied to ion guide 24 for providing confinement of the ions in the radial direction. Thus, an ion control field comprising a component for restraining movement of ions in directions normal to the guide axis and a component for controlling the movement of ions parallel to the guide axis is provided in ion guide 24.

Provision of an accumulation potential 58 such as that shown in FIG. 3 within ion guide 24 allows large ions 62 (i.e., ions having large m/z values) and small ions 66 (i.e., ions having small m/z values) to traverse ion guide 24 in a direction parallel to axis 174 and settle into the preferential region proximate to electrodes 34*b* and 34*c* provided by the low potential at 91, but prevents them from exiting the ion guide 24 by providing a higher potential on the aperture 46. As will be familiar to those skilled in the relevant arts, it may be beneficial in some circumstances to apply a DC offset voltage on ion guide 24 in addition to the DC voltage mentioned above. In that instance, the overall potential profile 58 would be elevated by the corresponding DC offset voltage.

FIG. 4 is an exemplary schematic diagram 400 of the ion guide, electrostatic lens, and mass analyzer of the '388 patent along with a pre-ejection potential profile of the ion guide. Pre-ejection potential profile 70 of FIG. 4 represents relative potential values, such as voltages or pressures, provided along axis 174 of ion guide 24. In the example shown in FIG. 4, pre-ejection profile 70 is similar to that described for accumulation potential profile 58 of FIG. 3, but with potential 91 replaced by potential 96 at portion 34*b* of the ion guide 24 and corresponding changes in potential gradient 92. Thus, a modified ion control field comprising a component for restraining movement of ions in directions normal to the guide axis and a component for controlling the movement of ions parallel to the guide axis is provided in ion guide 24.

Provision of a pre-ejection profile 70 such as that shown in FIG. 4 can, for example, be used to cause ions 62 of relatively larger m/z and ions 66 of relatively smaller m/z to move within ion guide 24 in a direction parallel to axis 174 and settle within the region of ion guide 24 between portion 34*b* of the guide and aperture 46. The potential at 96 can also prevent additional ions from entering ion guide 24 to a point beyond portion 34*b*.

FIG. 5 is an exemplary schematic diagram 500 of the ion guide, electrostatic lens, and mass analyzer of the '388 patent along with an ejection potential profile of the ion guide. Ejection potential profile 74 of FIG. 5 can be created by, for example, applying an alternating current ("AC") voltage within portion 34*c* of ion guide 24 and/or at an exit aperture 46, superimposed on voltages otherwise applied to the ion guide 24. For example, appropriate RF and DC potentials may be applied to opposed pairs of electrodes within an ion guide 24, along with suitable DC offset voltages applied to various sets of electrodes. The AC voltage can, for example, be superimposed over the RF voltage, while a difference between a potential at portion 34*c* and a potential at exit aperture 46 is reduced.

Ejection potential profile 74 along the axis of guide 24 can be provided by, for example, using a pseudopotential such as that represented by dashed lines at reference 78 in FIG. 5.

For example, at the beginning of an ejection cycle such as cycle 74 represented in FIG. 5, the magnitude or depth of a pseudopotential 78 may be chosen so that ions 62 of larger m/z ratios will leave exit 42 first. As the larger m/z ions 62 are released, the amplitude of the AC voltage may be gradually reduced to change the depth of the pseudopotential 78 well, and after a desired delay, to allow ions 66 of smaller m/z to leave ion guide 24. The delay may be determined by controlling the rate of change of the AC amplitude, and may, for example, be chosen based on the masses and/or m/z ratios of ions 62 and 66 to achieve a desired delay. In the situation shown in FIG. 5, ions 66 of smaller m/z travel faster than the ions 62 of larger m/z and gradient 78 is set accordingly. Gradient 78 is used to describe a variation of some parameter in space, but not in time.

Ions are provided to a desired point in space 56 disposed on, or substantially along, guide axis 174, as for example an extraction region in a TOF analyzer for detection and mass analysis using methods generally known in the art. This is represented at the right-hand portion of FIG. 5, where the different rates of travel of ions 62 and 66 have resulted in ions 62 and 66 reaching the orthogonal extraction region 56 in front of push plate 54, at substantially the same time. At this point, an extraction pulse 82 may be applied to push plate 54 to pulse ions 62, 66 through the accelerating column 55.

On Demand Concentration of Ion Packets in IDA

A paper entitled "A Novel Ion Trap That Enables High Duty Cycle and Wide m/z Range on an Orthogonal Injection TOF Mass Spectrometer" by Alexander V. Loboda and Igor V. Chernushevich published in the Journal of the American Society of Mass Spectrometry in July of 2009, vol. 20, no. 7, (hereinafter the "Loboda Paper") refers to the method of concentrating ion packets described in the '388 patent as Zeno pulsing. The Loboda Paper suggests that, due to reduced linear dynamic range when performing Zeno pulsing, the application strategy may involve limiting the Zeno pulsing method for use only in dependent MS/MS implementations. The rationale provided for limiting Zeno pulsing to MS/MS implementations was that intensities in dependent MS/MS experiments are in general several orders of magnitude lower than in TOF MS, and accordingly an average gain of 7 that may typically result from Zeno pulsing is more valuable. Furthermore, since instruments are capable of switching between normal and Zeno pulsing mode in a millisecond time scale, Zeno pulsing could be implemented "on demand" in information-dependent acquisitions (IDA) when a dependent MS/MS experiment was being triggered by detection of low intensity precursors in a preceding survey single MS experiment.

As a result, the Loboda Paper suggested monitoring the single MS survey scan for precursor ions with intensities below a certain threshold. For those precursor ions with intensities below the threshold, Zeno pulsing would be turned on for the one or more dependent MS/MS experiments of each precursor ion.

FIG. 6 is an exemplary diagram 600 showing the MS (precursor ion) spectra and MS/MS (product ion spectra) of an on demand IDA method of the Loboda Paper. In the IDA method, a single MS survey scan is performed, producing precursor ion spectrum 601. From precursor ion spectrum 601 an IDA precursor ion peak list is obtained. In this case, the peak list only includes precursor ions 610, 620, and 630.

The Loboda Paper describes performing on demand Zeno pulsing "in those MS/MS experiments that are triggered by low intensity precursor ions in single MS experiments." In FIG. 6, for example, precursor ion 610 is below an intensity threshold 640, and precursor ions 620 and 630 are above intensity threshold 640. As a result, precursor ion 610 is a low intensity precursor ion in precursor ion spectrum 601 of a single MS experiment.

Consequently, Zeno pulsing is performed in the MS/MS experiment of precursor ion 610. The MS/MS experiment of precursor ion 610 is represented in FIG. 6 by product ion spectrum 611.

In precursor ion spectrum 601, however, precursor ions 620 and 630 are above intensity threshold 640, so Zeno pulsing is not performed in the MS/MS experiments of precursor ions 620 and 630. The MS/MS experiments of precursor ions 620 and 630 are represented in FIG. 6 by product ion spectra 621 and 631, respectively.

As shown in FIG. 6, on demand Zeno pulsing of the Loboda paper entails selectively using Zeno pulsing in dependent MS/MS product ion experiments based on the intensity of precursor ions in a single MS precursor ion experiment.

One aspect of the implementation of Zeno pulsing in the Loboda Paper effectively limits on demand Zeno pulsing to IDA acquisition experiments. This aspect is the switching between normal mode and Zeno pulsing mode. More specifically, the Loboda Paper describes that, when switching between the two modes, the TOF repetition or pulsing rate is changed. It lists a TOF repetition rate of between 13 and 18 kHz for normal mode and a rate of between 1 and 1.25 kHz for Zeno pulsing mode.

This change in the TOF repetition rate is not instantaneous. The electronics of the TOF accelerator need time to settle when changing the TOF extraction pulse timing from the higher pulse timing frequency in normal mode to the lower pulse timing rate used in Zeno pulsing mode. As a result, a pause may be needed to introduce a settling time between normal mode and Zeno pulsing mode in order to maintain the same pulse amplitude of the TOF extraction pulses after changing the repetition rate. The Loboda Paper describes this switching time or settle time to be in the millisecond range, which was more likely tens or hundreds of milliseconds and dependent upon the power supplies and TOF pulser circuitry used in an implementation. As a result, the implementation of the Loboda Paper requires a delay in switching between the normal mode and Zeno pulsing modes.

FIG. 7 is an exemplary timing diagram 700 showing the two different TOF extraction pulses of a TOF mass analyzer for normal pulsing mode and Zeno pulsing mode and the settle time needed for switching between the two modes. In region 710 normal extraction pulsing is occurring every 0.1 ms for a TOF repetition rate of 10 kHz. Note that this repetition rate is simplified and used for illustrative purposes and the normal TOF repetition rate is typically higher as described above.

At 1 ms, the TOF repetition rate is switched to 1 kHz for Zeno pulsing mode. However, the electronics of the TOF accelerator need time to settle. The time for the electronics to settle after switching between TOF repetition rates can be significant and can impact availability for subsequent experiments.

In FIG. 7, region 720 represents 10 ms of settle time. Again, a 10 ms period for the settle time is used for illustrative purposes only and the actual settle time can typically be longer as described above.

After the settle time, the TOF mass analyzer continues to analyze the sample at the TOF repetition rate for Zeno pulsing mode of about 1 kHz. This repetition rate translates to one pulse every 1 ms, which is shown in region 730.

FIG. 7 illustrates that the settle time or switching time between the normal and Zeno pulsing modes as described in the Loboda paper is significant when compared to normal and Zeno pulsing periods. Although significant, the Loboda paper, found this delay to be acceptable for an IDA acquisition method. This is because IDA acquisition is typically used for identification where the precise shape or area of a particular chromatographic peak is not necessary. In other words, in IDA identification methods, it is not always necessary to quickly switch between normal and Zeno pulsing modes as it may be in other methods such as targeted methods for quantification.

Consequently, there is a need for systems and methods of operating a tandem mass spectrometer that allow for flexible adoption of Zeno pulsing modes without requiring a delay when switching between normal and Zeno pulsing modes. There is a further need for systems and methods of operating a tandem mass spectrometer that allow switching between normal and Zeno pulsing modes in acquisition methods other than IDA.

SUMMARY

The teachings herein relate to controlling a mass spectrometer to dynamically concentrate ion packets in the extraction region of a mass analyzer within a targeted acquisition experiment in order to increase the dynamic range of the experiment. More specifically, systems and methods are provided to dynamically turn on and off an ion guide that concentrates ion packets of varying mass-to-charge ratio (m/z) values at the accelerator of a time-of-flight (TOF) mass analyzer within a quantitative targeted acquisition experiment in order to increase the dynamic range of quantitative peaks and prevent saturation. Concentrating ion packets in the extraction region of a mass analyzer can improve the sensitivity of the instrument without loss of mass accuracy or resolution. However, this concentration of ion packets also significantly reduces the linear dynamic range of the detection subsystem of a mass spectrometer. By judiciously turning on and off this concentration of ion packets within a quantitative targeted acquisition, the linear dynamic range of the detection subsystem can effectively be increased.

The systems and methods herein can be performed in conjunction with a processor, controller, or computer system, such as the computer system of FIG. 1.

A system, method, and computer program product are disclosed for operating an ion guide and a TOF mass analyzer of a tandem mass spectrometer to dynamically concentrate or not concentrate product ions with different mass-to-charge ratio (m/z) values before injection into a TOF mass analyzer based on a previously measured intensity of a targeted product ion in a targeted acquisition. More specifically all three embodiments are directed to dynamically switching an ion guide and a TOF mass analyzer between a sequential or Zeno pulsing mode and a continuous or normal pulsing mode in a targeted acquisition.

Some embodiments include the following steps.

A sample containing a known compound is continuously received and ionized using an ion source device, producing an ion beam.

Product ions produced from a known precursor ion of the known compound selected from the ion beam in a targeted acquisition method are received using an ion guide defining a guide axis.

Product ions ejected from the ion guide into an extraction region along the guide axis are received and the intensity of at least one known product ion of the known precursor ion is measured at two or more time steps of the targeted acquisition method using a TOF mass analyzer downstream of the ion guide.

The ion guide is instructed to eject the product ions of the known precursor ion using a sequential or Zeno pulsing mode where there is a sequential ejection of the product ions from the ion guide to the TOF mass analyzer according to the m/z values of the product ions to provide for arrival of product ions of substantially all released m/z values within the extraction region at substantially the same time and the TOF mass analyzer is instructed to measure the intensity of the at least one known product ion at each time step of the two or more time steps using a processor.

If the intensity of the at least one known product ion is increasing and is greater than a predefined sequential mode intensity threshold at a time step, the ion guide is instructed to switch to a continuous or normal pulsing mode where there is a continuous ejection of product ions from the ion guide to the TOF mass analyzer irrespective of the m/z values of the product ions and the TOF mass analyzer is instructed to measure the m/z of the at least one known product ion at each time step of the remaining two or more time steps using the processor.

In some embodiments, a mass spectrometer is provided. The mass spectrometer including an ion guide and a mass analyzer. The ion guide defining a guide axis and adapted to provide an ion control field comprising a component for restraining movement of ions normal to the guide axis and comprising a component for controlling movement of the ions parallel the guide axis. The field having a controllable potential profile along the guide axis of the guide, the profile being adapted to selectively provide for either continuous release of the ions from the ion guide (normal mode) or for sequential release of the ions from the guide (Zeno pulsing mode) according to the mass-to-charge ratios of the ions, and along a path parallel to the guide axis, wherein the same ion energy is applied to the ions over their travel through the ion guide to an extraction region disposed substantially along the guide axis irrespective of mass-to-charge ratio of the ions, and the ions are sequentially released with the same ion energy from the ion guide to provide for arrival of ions of substantially all released mass-to-charge ratios within the extraction region at substantially the same time and synchronized to coincide with a Time of Flight (TOF) extraction pulse of the mass analyzer, wherein the TOF extraction pulse has a same pulse timing during both continuous release and sequential release.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
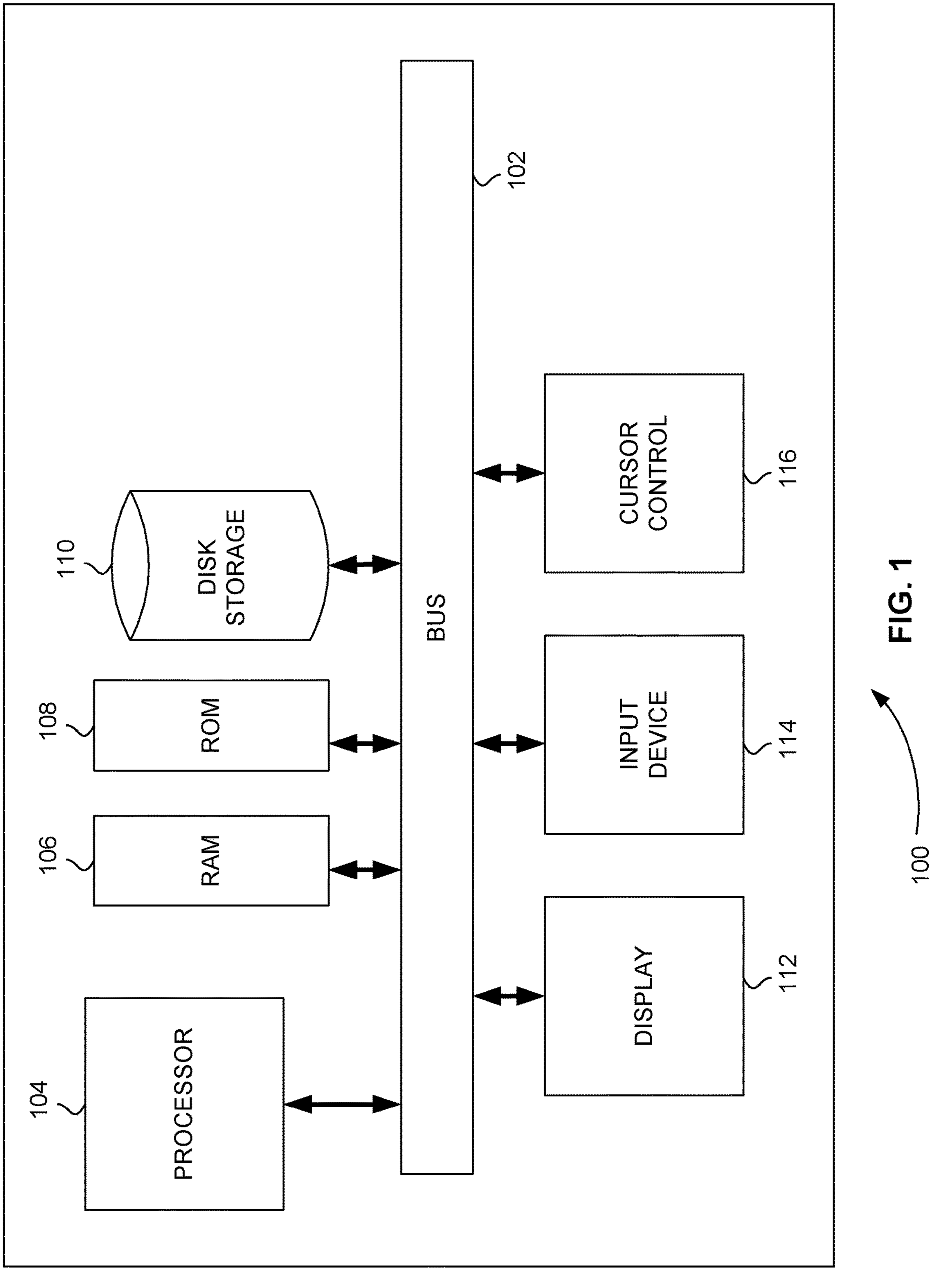
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Dynamic Switching of Zeno Pulsing

As described above, the '388 patent provides apparatus and methods that allow analysis of ions over broad m/z ranges with virtually no transmission losses. Specifically, an ion guide of the '388 patent traps ions before a TOF mass analyzer and ejects them sequentially according to their m/z so that all ions irrespective of their m/z arrive and are concentrated at an extraction region of the TOF mass analyzer at the same time.

The Loboda Paper refers to the sequential ejection of ions from an ion guide as Zeno pulsing. The Loboda Paper also suggests performing Zeno pulsing in an on demand mode in IDA acquisition experiments.

In the on demand mode suggested in the Loboda Paper, if a low intensity precursor ion is found in a single MS experiment of an IDA acquisition, then Zeno pulsing is applied to the product ion MS/MS experiments of that precursor ion. The implementation of Zeno pulsing in the Loboda Paper effectively limits on demand use of Zeno pulsing to IDA acquisition experiments. This is because the implementation of Zeno pulsing in the Loboda Paper requires a change in the TOF repetition rate when switching between normal and Zeno pulsing and this, in turn, causes a switching time or settle time delay between normal and Zeno pulsing in the millisecond range. The change in the TOF repetition rate also requires two sets of TOF calibration coefficients.

Consequently, there is a need for systems and methods of operating a tandem mass spectrometer that allow switching between normal and Zeno pulsing modes in acquisition methods other than IDA. More specifically, there is a need for systems and methods of operating a tandem mass spectrometer that allow switching between normal and Zeno pulsing modes in a quantitative targeted acquisition method.

Figure 8:
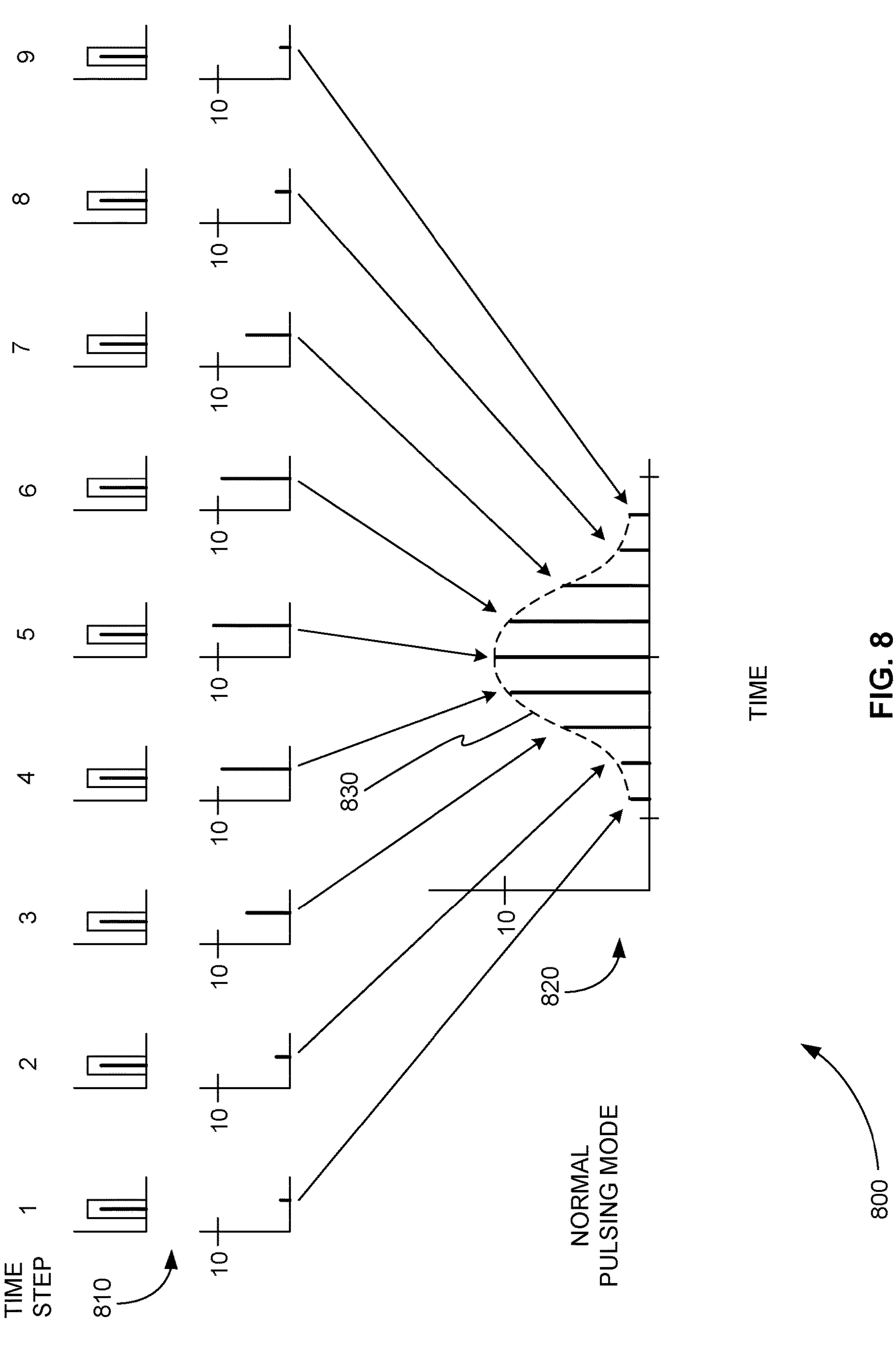
FIG. 8 is an exemplary diagram showing how an extracted ion chromatogram (XIC) is obtained in a quantitative targeted acquisition method such as multiple reaction monitoring (MRM) using a tandem mass spectrometer in normal pulsing mode, in accordance with various embodiments.

FIG. 8 is an exemplary diagram 800 showing how an extracted ion chromatogram (XIC) is obtained in a quantitative targeted acquisition method such as multiple reaction monitoring (MRM) using a tandem mass spectrometer in normal pulsing mode, in accordance with various embodiments. In FIG. 8, the product ion intensity for a single precursor ion to product ion transition 810 is measured at nine different time steps or cycles using normal pulsing mode. At each time step, the precursor ion of transition 810 is selected and fragmented, and the intensity of the product ion of transition 810 is measured. In chromatogram 820, the intensities of the product ion of transition 810 are plotted over time. From these intensities, XIC peak 830 is calculated.

XIC peak 830 is used to quantitate the amount of a compound represented by transition 810 in the sample analyzed. For example, the area of XIC peak 830 can be used to determine the quantity of the compound in the sample analyzed. The area of XIC peak 830 can be compared to the area of calibration XIC to determine the quantity.

As described in the Loboda paper, Zeno pulsing can increase sensitivity without a loss of mass accuracy or resolution. As a result, Zeno pulsing can increase the sensitivity of a quantitative targeted acquisition. In other words, Zeno pulsing can improve the accuracy of the calculated XIC peak used in quantitation. One problem with Zeno pulsing, however, is that the large increase in sensitivity can result in saturation at the detector of the tandem mass spectrometer.

Not only does the sensitivity gain cause saturation, but ions are measured less frequently because the frequency is about 10 times smaller in Zeno pulsing. Even with the same TOF repetition rate in both modes, ions are 'grouped' and sent into TOF analyzer every $10^{th}$ time only in Zeno pulsing mode.

Figure 9:
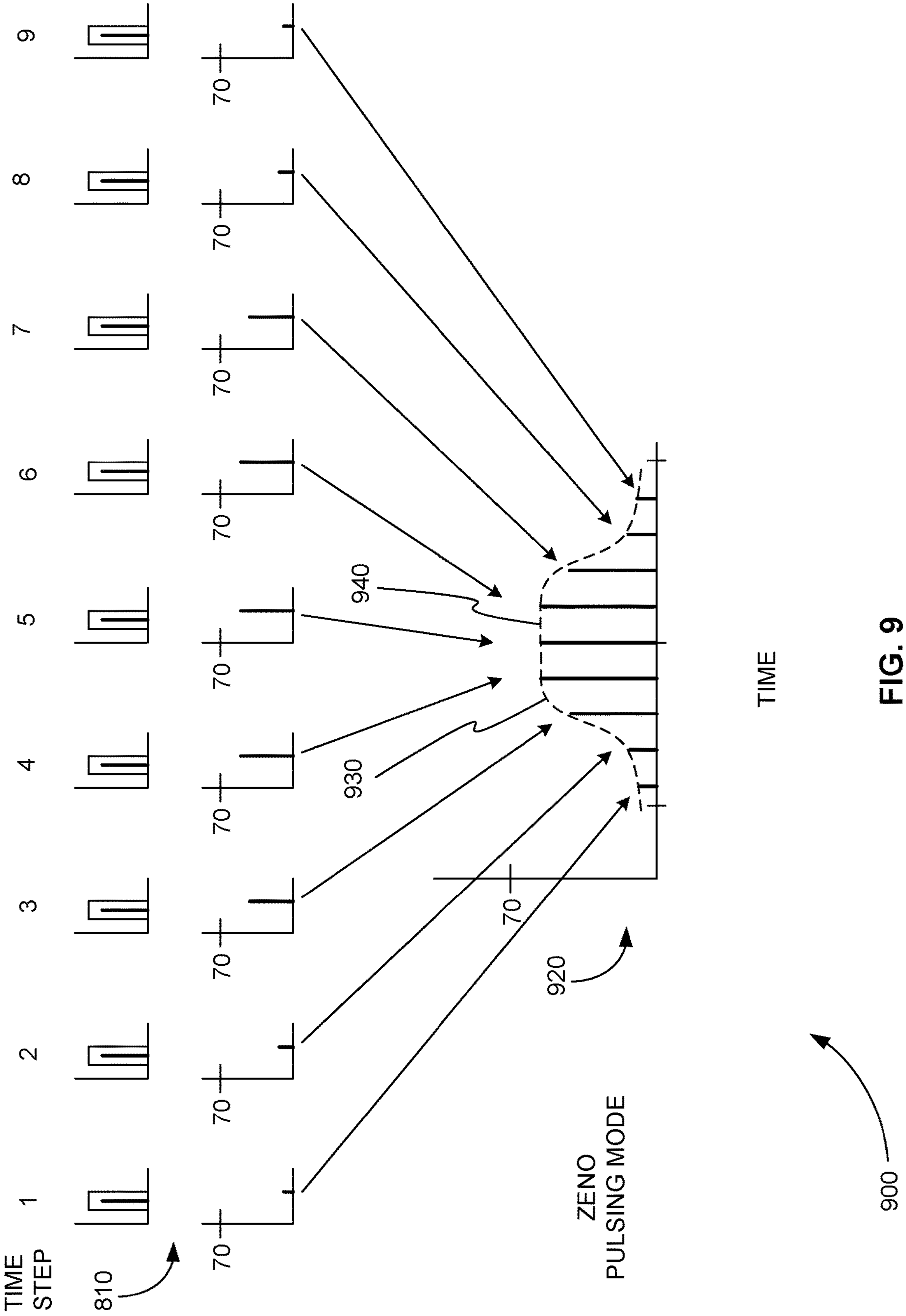
FIG. 9 is an exemplary diagram showing how saturation can occur when an XIC is obtained in a quantitative targeted acquisition method such as MRM using a tandem mass spectrometer in Zeno pulsing mode, in accordance with various embodiments.

FIG. 9 is an exemplary diagram 900 showing how saturation can occur when an XIC is obtained in a quantitative targeted acquisition method such as MRM using a tandem mass spectrometer in Zeno pulsing mode, in accordance with various embodiments. In FIG. 9, the product ion intensity for the same single precursor ion to product ion transition 810 used in FIG. 8 is measured at nine different time steps or cycles using Zeno pulsing mode. At each time step, the precursor ion of transition 810 is selected and fragmented, and the intensity of the product ion of transition 810 is measured. In chromatogram 920, the measured intensities of the product ion of transition 810 are plotted over time. From these intensities XIC peak 930 is calculated.

Note that compared with XIC peak 830 of FIG. 8 XIC peak 930 of FIG. 9 has a 7-fold gain in sensitivity (the y-axis intensity scale of chromatogram 920 is 7 times larger than the y-axis intensity scale of chromatogram 820 of FIG. 8). However, the apex 940 of XIC peak 930 of FIG. 9 is flattened due to saturation of the detector of the tandem mass spectrometer. In other words, the large gain in sensitivity produced by Zeno pulsing causes detector saturation. As a result, XIC peak 930 is distorted and cannot be used for quantitation.

In some embodiments, Zeno pulsing mode may be selected based on a previously measured ion intensity and the mass spectrometer may be operative to dynamically transition from normal mode to Zeno pulsing mode while maintaining a constant TOF extraction pulse timing for both the continuous release of ions in normal mode and the sequential release of ions in Zeno pulsing mode.

In some embodiments, Zeno pulsing mode may be selected based on a previously measured ion intensity and the mass spectrometer may be operative to dynamically transition from normal mode to Zeno pulsing mode without introducing a settling time or delay period between the normal mode and the Zeno pulsing mode. In some aspects, the Zeno pulse mode is synchronized to a TOF extraction pulse timing such that substantially all ions collected during a Zeno period arrive in an extraction region to coincide with a TOF extraction pulse that has a same pulse timing during both normal mode with continuous release of ions and Zeno pulsing mode with sequential release of ions.

In various embodiments, the large gain in sensitivity produced by Zeno pulsing is obtained and saturation is avoided by dynamically switching between Zeno pulsing mode and normal pulsing mode within the same quantitative targeted acquisition experiment. In some embodiments, the switching between pulsing modes is triggered by the previously measured intensity of the product ion. In other words, if the intensity of the product ion exceeds a certain threshold, Zeno pulsing mode is turned off and normal pulsing mode is turned on. Similarly, if the previously measured intensity of the product ion is less than or equal to a certain threshold, normal pulsing mode is turned off and Zeno pulsing mode is turned back on.

Figure 10:
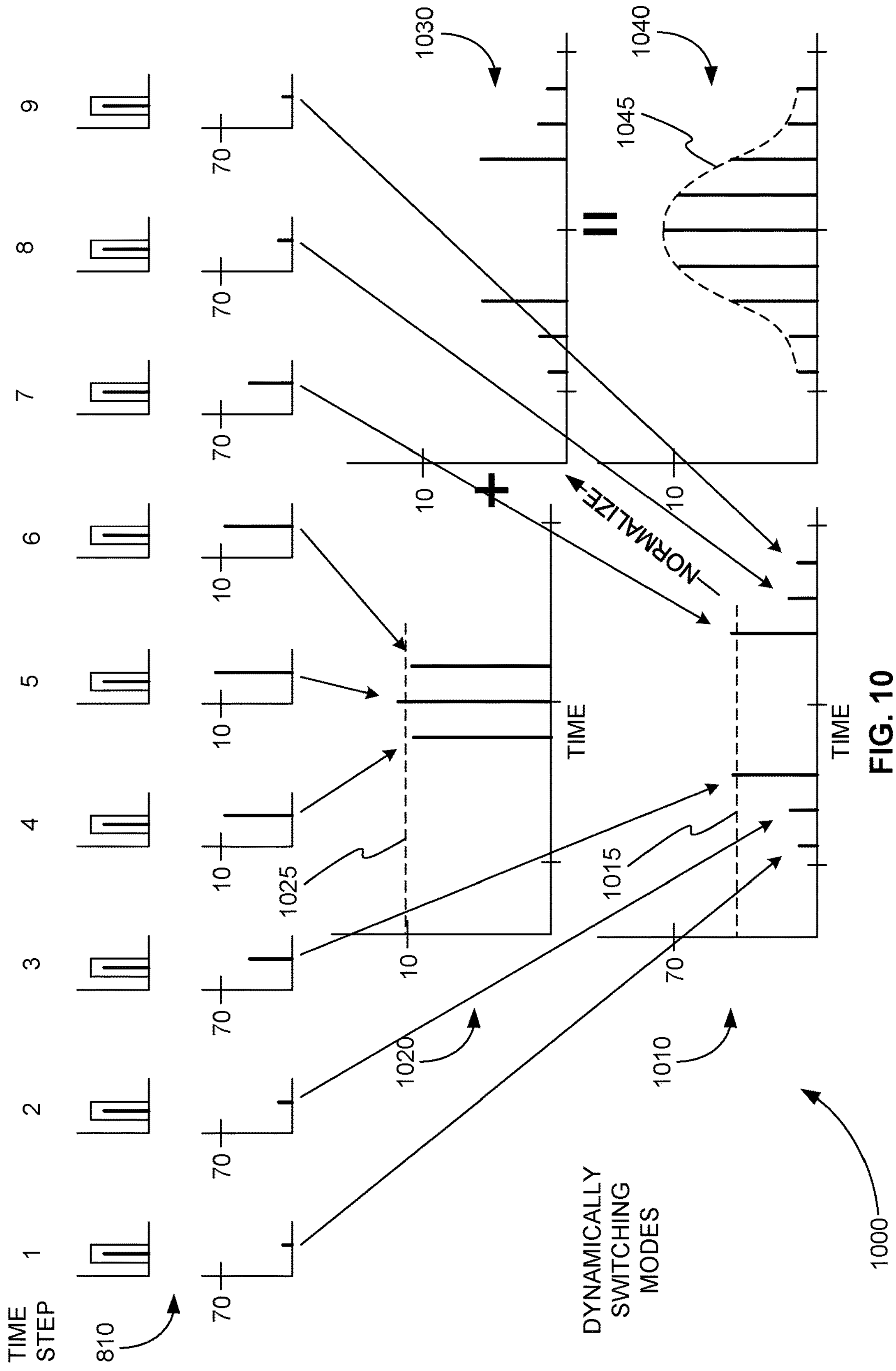
FIG. 10 is an exemplary diagram showing how dynamic switching between Zeno pulsing mode and normal pulsing mode is used to obtain an XIC in a quantitative targeted acquisition method with increased sensitivity and without saturation, in accordance with various embodiments.

FIG. 10 is an exemplary diagram 1000 showing how dynamic switching between Zeno pulsing mode and normal pulsing mode is used to obtain an XIC in a quantitative targeted acquisition method with increased sensitivity and without saturation, in accordance with various embodiments. In FIG. 10, the product ion intensity for the same single precursor ion to product ion transition 810 used in FIG. 8 is measured at nine different time steps or cycles. At each time step, the precursor ion of transition 810 is selected and fragmented, and the intensity of the product ion of transition 810 is measured.

Initially, the intensities of the product ion of transition 810 are measured using the Zeno pulsing mode. For example, at time steps 1, 2, and 3, the intensities are measured using the Zeno pulsing mode. Zeno pulsing is used initially because the intensities are low and can benefit from the higher sensitivity of Zeno pulsing. The intensities at time steps 1, 2, and 3 are shown plotted in a Zeno mode chromatogram 1010.

In order to prevent saturation, the intensities at time steps 1, 2, and the 3 are each compared to a Zeno pulsing mode intensity threshold 1015, for example. If the measured intensity is greater than Zeno pulsing mode intensity threshold 1015 and the previously measured intensity in Zeno pulsing mode is less than the measured intensity, then the tandem mass spectrometer is switched from Zeno pulsing mode to normal pulsing mode. For example, at time step 3, the measured intensity is greater than Zeno pulsing mode intensity threshold 1015. The measured intensity at time step 3 is also greater than the measured intensity at time step 2, showing that the measured ion intensity is increasing. As a result, saturation is likely, so the pulsing mode is switched to normal mode.

At time step 4, the intensity of the product ion of transition 810 is now measured using the normal pulsing mode. This intensity is plotted in normal mode chromatogram 1020. Note that in normal pulsing mode the intensities are reduced to 1/7 the intensities in Zeno pulsing mode. Consequently, saturation is prevented.

Mass analysis continues in normal pulsing mode until the measured intensity of the product ions decreases below a normal pulsing mode intensity threshold 1025. For example, normal pulsing mode is used to measure the intensity at time steps 5 and 6 in addition to time step 4.

At time step 6, however, the measured intensity is less than normal pulsing mode intensity threshold 1025. In addition, the measured intensity at time step 6 is also less than the measured intensity at time step 5, showing that the measured ion intensity is decreasing. As a result, saturation is not likely to occur, so the Zeno pulsing mode may be selected to increase sensitivity of the mass spectrometer. Consequently, at time steps 7, 8, and 9, the intensities are measured using the Zeno pulsing mode. The intensities at time steps 7, 8, and 9 are shown plotted in the Zeno mode chromatogram 1010.

Due to the switching from Zeno mode pulsing to normal mode pulsing and back again to Zeno mode pulsing, the intensities of the product ion of transition 810 in normal mode chromatogram 1020 and Zeno mode chromatogram 1010 must be combined to calculate an XIC peak. However, the scales of intensity in chromatograms 1010 and 1020 differ by a factor of 7.

As a result, the intensities of one of the chromatograms need to be scaled or normalized to the intensities of the other chromatogram. Because calibration data used for the quantitation is typically obtained in normal pulsing mode, the intensities measured using Zeno pulsing mode are preferably normalized to the intensities measured using normal pulsing mode in order to have consistent intensity measurements when comparing different measurements taken using normal mode. In other words, and as shown in FIG. 10, the intensities of Zeno mode chromatogram 1010 are scaled or normalized to the intensities of normal mode chromatogram 1020 producing normalized chromatogram 1030.

While the intensities may conveniently be scaled down from the Zeno pulsing mode measurement to match the normal mode measurement, in some embodiments it may be preferable to scale up from the normal mode measurement to match the Zeno pulsing mode measurement. Either scaling operation is operable, provided the intensity measurements made in each of the modes are normalized with one another when the Zeno chromatograms are combined with the normal chromatograms for final presentation.

Note that the factor of 7 is an average Zeno pulsing gain for the particular instrument described in Loboda Paper. In reality it is different depending on the geometry of the machine, and is also different for ions with different m/z, varying from 3 to about 25. There is a formula predicting gain dependence on m/z value $$\text{Gain} = C\sqrt{\frac{(m/z)_{max}}{(m/z)}},$$

where C is a geometrical factor, (m/z)max is the largest value of m/z recorded in spectra.

Now that normal mode chromatogram 1020 and normalized chromatogram 1030 have the same intensity scale, they can be combined. For example, normal mode chromatogram 1020 and normalized chromatogram 1030 are added producing a combined chromatogram 1040. An XIC peak 1045 is finally calculated from the combined chromatogram 1040. XIC peak 1045 is used for quantitation.

FIG. 10 shows that by basing the dynamic switching between Zeno and normal pulsing modes on an intensity of a detected product ion, rather than a precursor ion as suggested in the Loboda Paper, dynamically controlled Zeno pulsing mode can be used in a targeted acquisition method. As implemented in the Loboda paper, however, only switching based on precursor ions was contemplated and furthermore switching based on detected product ion intensity was not fast enough for targeted acquisition because of the required settle time between modes.

In various embodiments, dynamic switching between Zeno and normal pulsing modes may be implemented without changing the TOF repetition rate such that the pulse timing of the TOF extraction pulses is constant as the ion guide switches between normal mode with continuous release of ions to the TOF extraction region and Zeno pulsing mode with sequential release of ions to the TOF extraction region. Since the TOF extraction pulse frequency is maintained constant, there is no need to accommodate changes in the TOF extraction pulsing circuitry and, as a result, there is no settle time delay required when switching between normal and Zeno pulsing modes.

Figure 11:
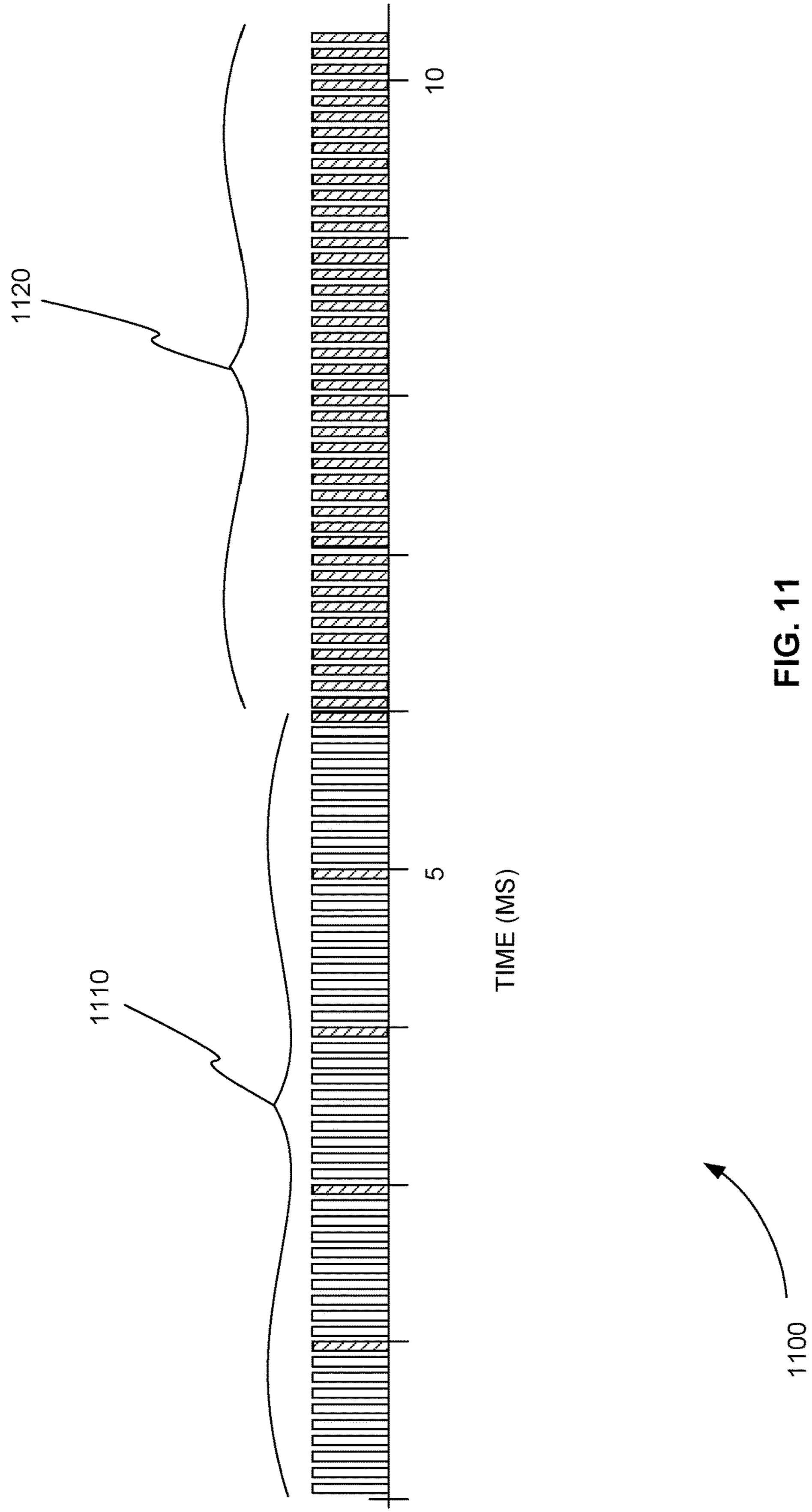
FIG. 11 an exemplary timing diagram showing that the same TOF extraction pulses of a TOF mass analyzer can be used for Zeno pulsing mode and normal pulsing mode and that no settle time is needed for switching between the two modes, in accordance with various embodiments.

FIG. 11 an exemplary timing diagram 1100 showing that the same TOF extraction pulse frequency of a TOF mass analyzer can be used for Zeno pulsing mode and normal pulsing mode and that no settle time needs to be accommodated when switching between the two modes, in accordance with various embodiments. In this embodiment the TOF extraction pulse has a same pulse timing during both Zeno pulsing mode (sequential release of ions) and normal pulsing mode (continuous release of ions), and the sequential release of ions may be synchronized such that arrival of the sequentially released ions is synchronized with the TOF extraction pulse timing. Accordingly, a frequency of TOF extraction pulses remains constant while the mass spectrometer selectively switches between continual release and sequential release of the ions.

In region 1110, Zeno extraction pulsing is occurring every 0.1 ms for a TOF repetition rate of 10 kHz but the trap is maintained for each period of 1 ms, i.e. for a period including 10 0.1 ms TOF extraction pulses. Although the TOF repetition rate is 10 kHz, due to the concentration of ions in the trap while in Zeno pulsing mode, ions are only pushed on every tenth pulse (as illustrated by the shading of the tenth pulse). In other words, in the first nine pulses, no ions are pushed because no ions have arrived at the extraction region yet. Note that this repetition rate and period is used for simplified illustrative purposes only, and the TOF repetition rate is typically higher as described above.

At 6 ms, region 1120 defines the normal mode in which TOF pulsing is switched from Zeno pulsing mode to normal pulsing mode. In this embodiment, the TOF repetition rate remains at 10 kHz, however each pulse may now contain ions (as illustrated by the shading of the pulses) because ions are no longer being concentrated in the extraction region on every 10th pulse.

Accordingly, the TOF extraction pulses continuously run at a defined pulse rate, and a transition between Zeno pulsing mode and normal pulsing mode is effected by first energizing the ion trap to initiate Zeno pulsing mode and capture ions travelling along the ion guide, holding the ion trap for the duration of the Zeno pulse period, and releasing the ion trap at the end of the Zeno pulse, i.e. at 6 ms in FIG. 11, to release the captured ions from the trap and allow them to travel to the mass analyzer. In some aspects, one or more cycles of the Zeno capture mode may be implemented before the system switches back to normal pulsing mode. The de-energization at the end of each Zeno period being synchronized such that the sequentially released ions arrive at the extraction region coincident with a corresponding pulse of the ongoing TOF extraction pulsing. In this manner, the TOF extraction pulsing frequency is an integer multiple of the Zeno pulsing frequency and the trap energization, and ion release is synchronized with a corresponding TOF extraction pulse. Accordingly the TOF extraction pulse frequency remains constant while the system may selectively switch between continual release in normal mode and sequential release in Zeno pulsing mode without a delay or settling period between modes.

As a result, there is no switching of the TOF repetition rate and no settle time delay to allow for the TOF extraction pulse circuitry to adjust to a change in pulse timing frequency. This means that there is essentially no delay when transitioning between Zeno pulsing mode with sequential release of ions to normal pulsing mode with continuous release of ions, which allows for the use of dynamic switching between Zeno pulsing mode and normal pulsing mode in targeted acquisition methods. It also means that the two sets of TOF calibration coefficients described in the Loboda Paper are no longer needed, simplifying the implementation.

However, careful timing of the concentration and sequential release of ions on a single pulse of the TOF repetition rate in Zeno pulsing mode is needed. Also, the calculation of the count of ions in Zeno pulsing mode must ignore the TOF extraction pulses that are fired while the ion guide is trapping ions and not releasing ions to the extraction region.

In an embodiment, the sequential release of ions during Zeno pulse mode is synchronized such that the arrival of the sequentially released ions to the extraction region is synchronized to coincide with the TOF extraction pulses in the extraction region. In some embodiments, the arrival is synchronized by monitoring and detecting a threshold voltage in the TOF pulsing circuit to determine a pulse timing of the TOF pulsing circuit. The detected threshold voltage may be used to match a timing of the energization, and subsequent de-energization, of the ion trap when Zeno pulsing mode is activated to the pulse timing identified based on the threshold voltage.

In summary, in contrast to the on demand method of the Loboda Paper that switches to Zeno pulsing mode for a dependent MS/MS experiment based on the intensity of a precursor ion in a single MS survey experiment, a dynamic switching method of various embodiments is provided here that may be operative to switch to or from Zeno pulsing mode within a sequence of MS/MS experiments based on the previous measurement of the product ion in that MS/MS experiment. As a result, this dynamic switching method may also be used in a targeted acquisition method, for instance.

Further, the on demand method of the Loboda Paper requires a change in the TOF repetition rate when switching between normal and Zeno pulsing modes. In the dynamic switching method of various embodiments, the TOF repetition rate is not changed between normal and Zeno pulsing modes. As a result, in the dynamic switching method of various embodiments, there is no time delay in switching between normal and Zeno pulsing modes and no need for two sets of TOF calibration coefficients. Again, this enhanced performance allows the dynamic switching method to be used in a targeted acquisition method in addition to IDA, and reduces the time required for analysis.

System for Dynamically Switching Between Zeno and Normal Modes

Figure 2:
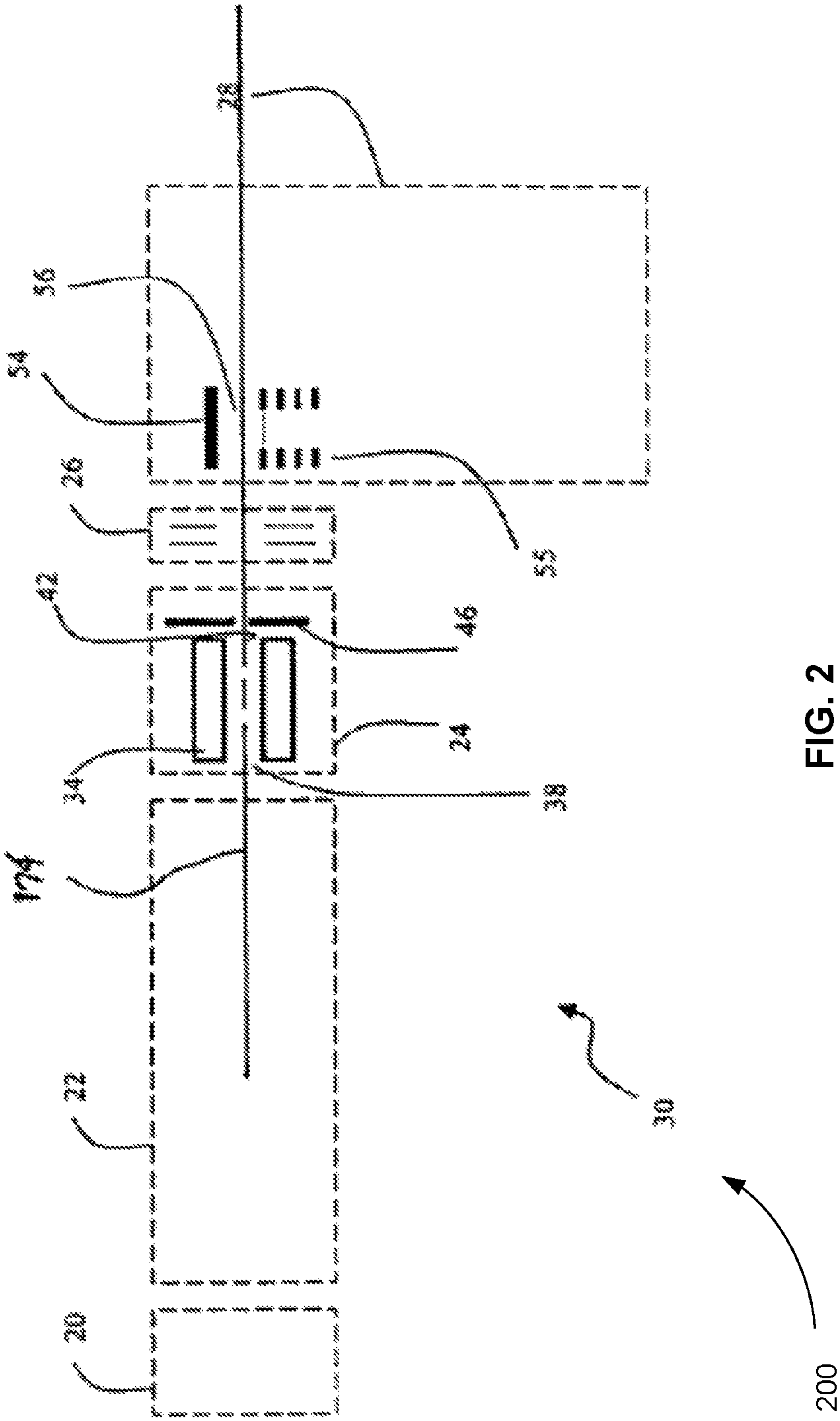
FIG. 2 PRIOR ART
FIG. 2 is an exemplary schematic diagram of a mass spectrometer.
Figure 3:
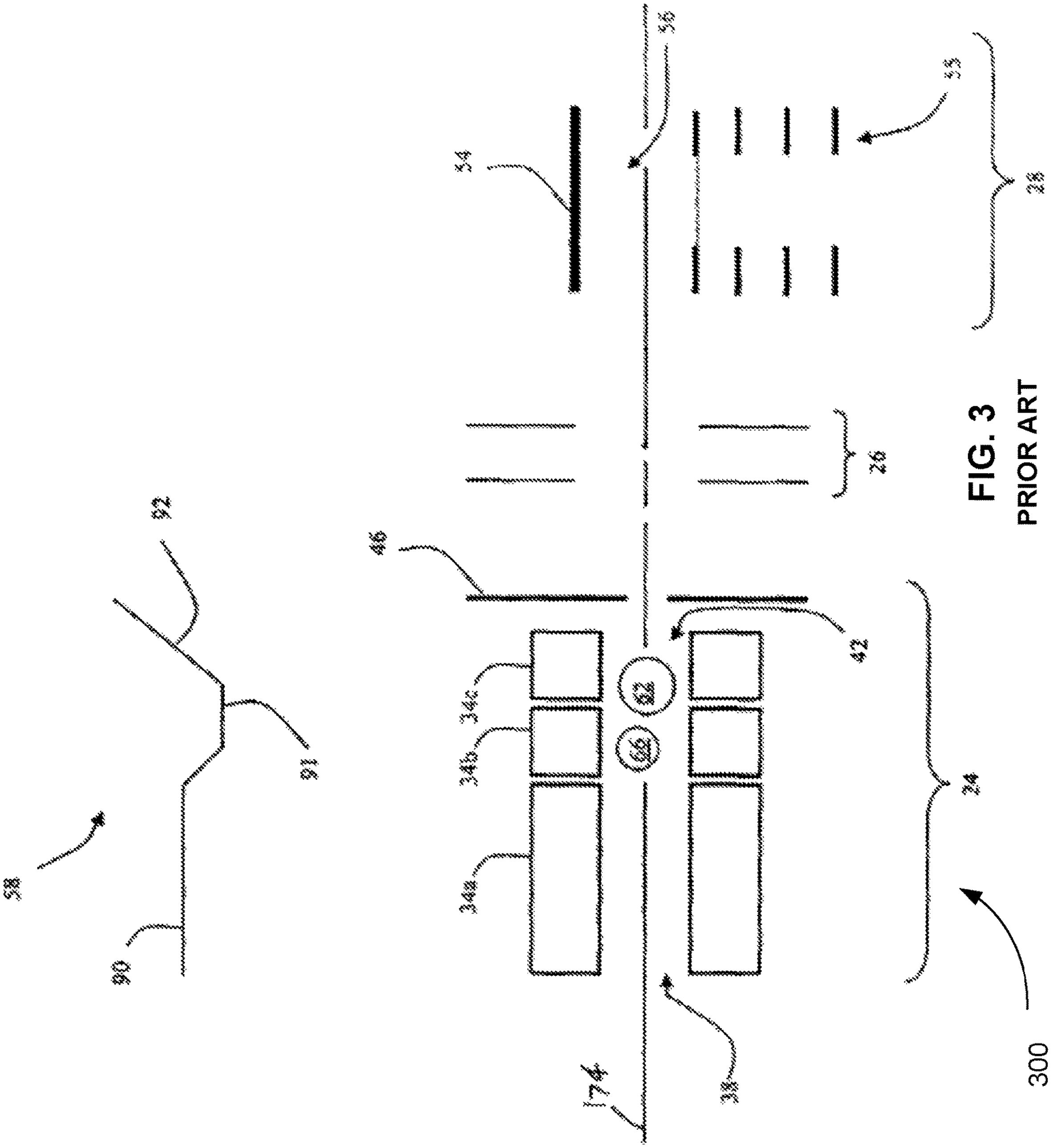
FIG. 3 PRIOR ART
FIG. 3 is an exemplary schematic diagram of the ion guide, electrostatic lens, and TOF mass analyzer of the '388 patent along with an accumulation potential profile of the ion guide.
Figure 4:
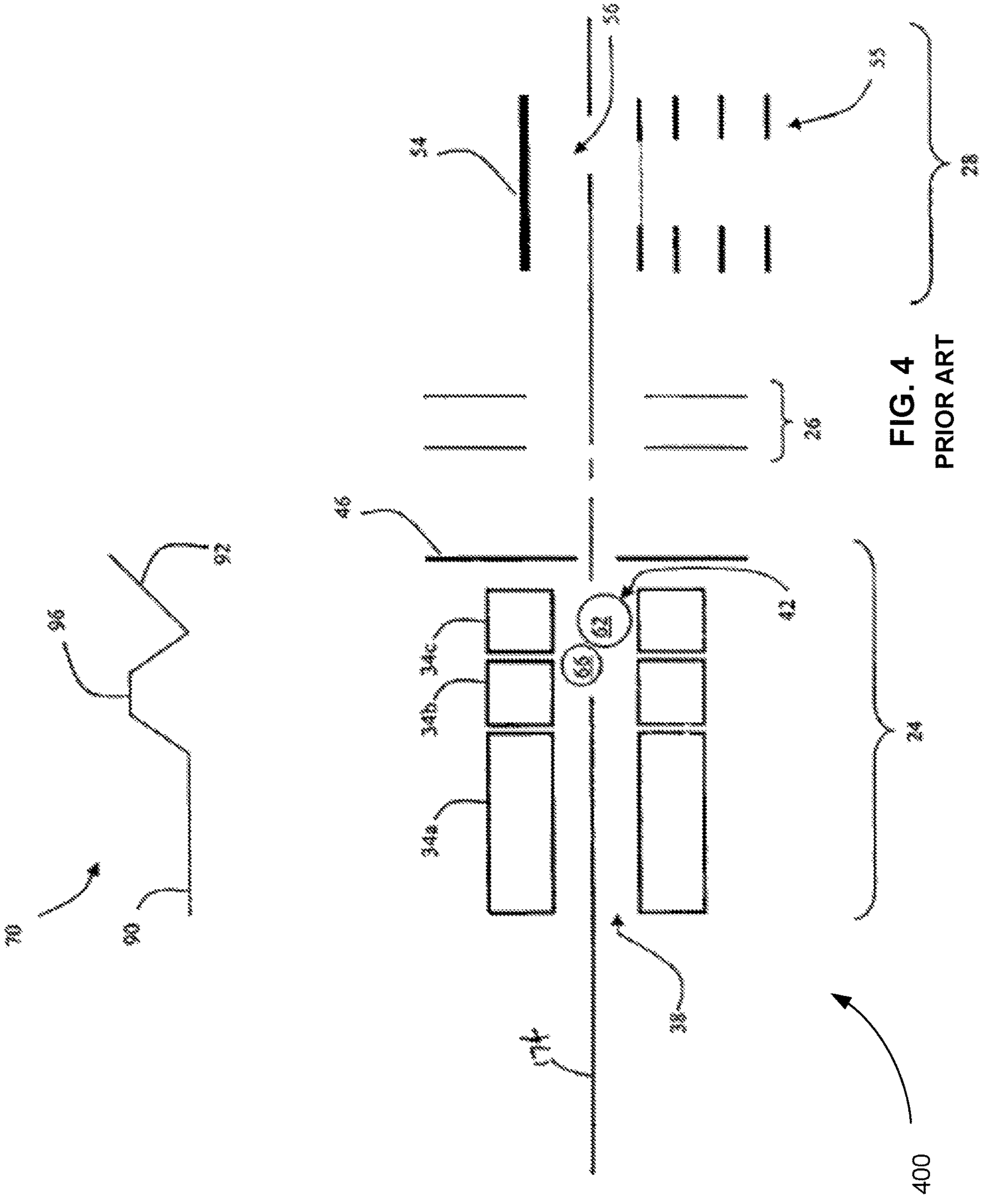
FIG. 4 PRIOR ART
FIG. 4 is an exemplary schematic diagram of the ion guide, electrostatic lens, and TOF mass analyzer of the '388 patent along with a pre-ejection potential profile of the ion guide.
Figure 5:
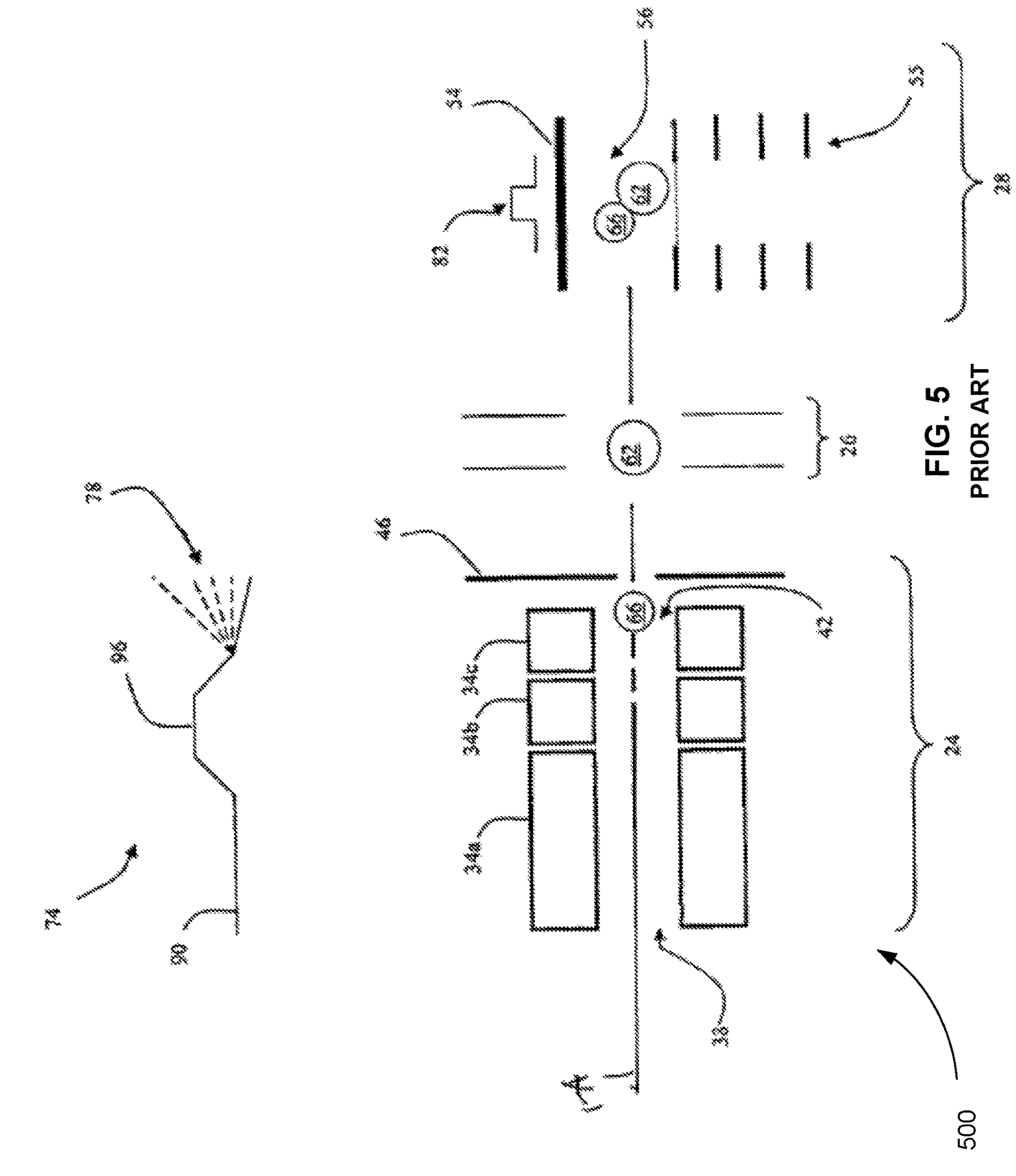
FIG. 5 PRIOR ART
FIG. 5 is an exemplary schematic diagram of the ion guide, electrostatic lens, and TOF mass analyzer of the '388 patent along with an ejection potential profile of the ion guide.
Figure 6:
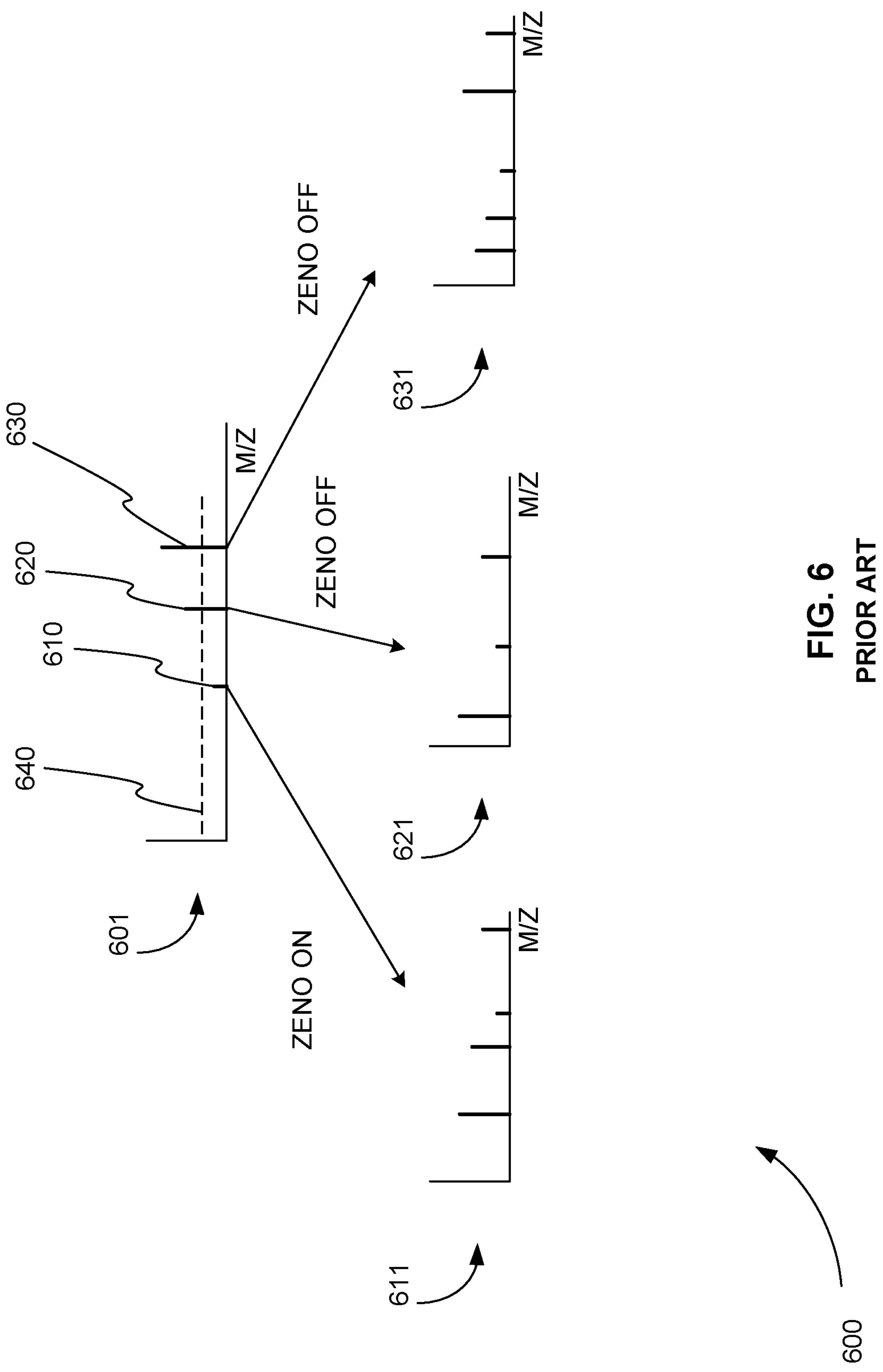
FIG. 6 PRIOR ART
FIG. 6 is an exemplary diagram showing the MS (precursor ion) spectra and MS/MS (product ion spectra) of an on demand IDA method of the Loboda Paper.
Figure 7:
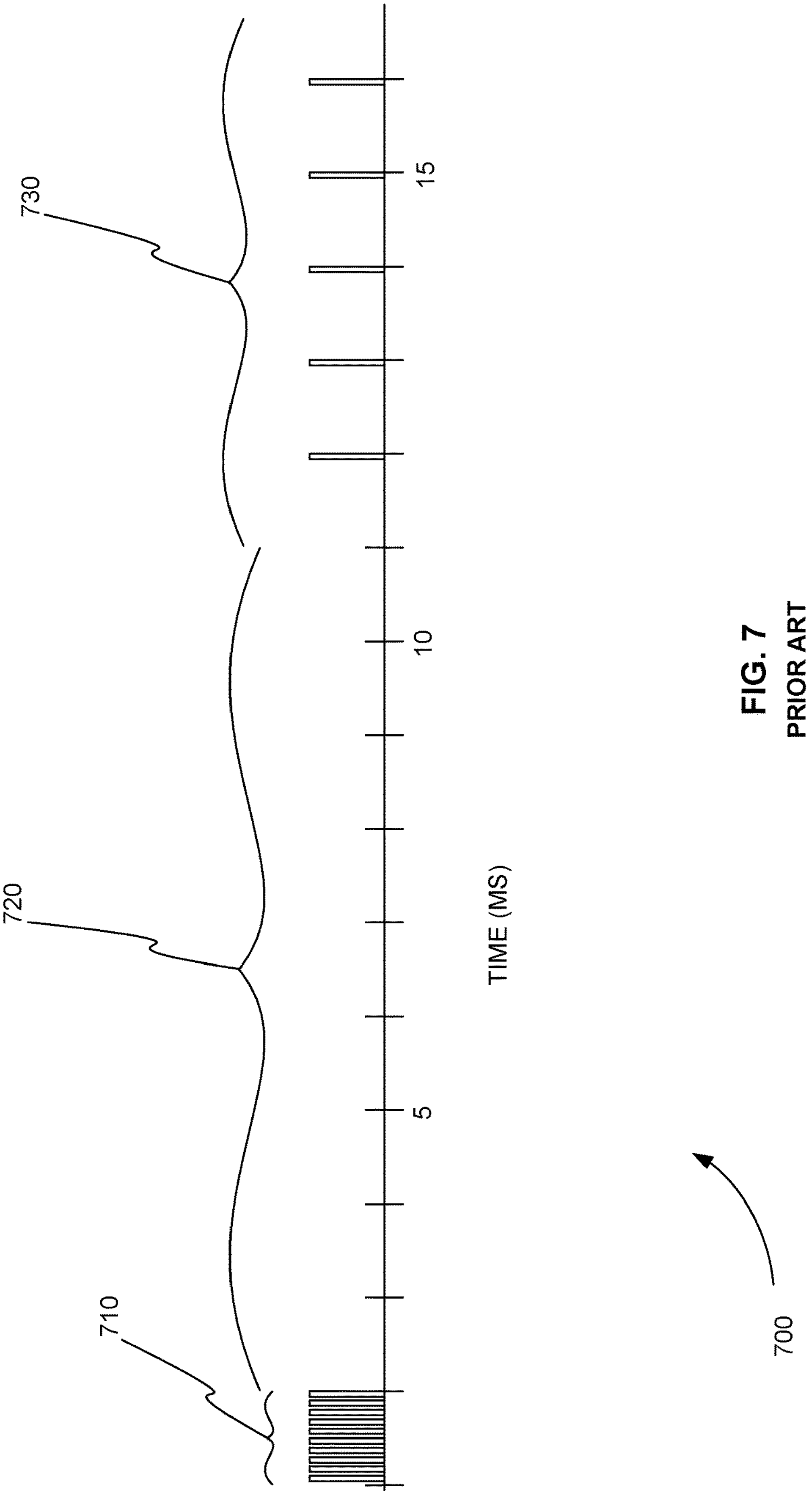
FIG. 7 PRIOR ART
FIG. 7 is an exemplary timing diagram showing the two different TOF extraction pulses of a TOF mass analyzer for normal pulsing mode and Zeno pulsing mode and the settle time needed for switching between the two modes.

Returning to FIG. 2, a system for dynamically switching between Zeno and normal pulsing modes includes tandem mass spectrometer 30 and a processor (not shown). The processor can be, but is not limited to, a computer, a microprocessor, the computer system of FIG. 1, or any device capable of sending and receiving control signals and data to and from tandem mass spectrometer 30 and processing data. The processor is in communication with, at least, ion guide 24 and TOF mass analyzer 28.

More generally, ion guide 24 and TOF mass analyzer 28 of tandem mass spectrometer 30 are operated to dynamically concentrate or not concentrate product ions with different mass-to-charge ratio (m/z) values before injection into TOF mass analyzer 28 based on a previously measured intensity of a targeted product ion in a targeted acquisition method. Zeno pulsing mode concentrate product ions with difference m/z values while normal pulsing mode does not.

Ion source device 20 continuously receives and ionizes a sample containing a known compound, producing an ion beam along guide axis 174. As described above, ions from ion source 20 may be passed into an ion manipulation region 22, where ions can be subjected to ion beam focusing, ion selection, ion ejection, ion fragmentation, ion trapping, or any other generally known forms of ion analysis, ion chemistry reaction, ion trapping or ion transmission. Ions so manipulated can exit the manipulation region 22 and pass into an ion guide indicated by 24.

Ion guide 24 defines guide axis 174 and receives product ions fragmented from a known precursor ion of the known compound selected from the ion beam in a targeted acquisition method. The known precursor ion is selected and fragmented in manipulation region 22.

TOF mass analyzer 28 is located adjacent to ion guide 24. As described above, electrostatic lens 26 may be considered a part of ion guide 24. TOF mass analyzer 28 receives product ions ejected from ion guide 24 into an extraction region 56 of TOF mass analyzer 28 along guide axis 174 and measures the intensity of at least one known product ion of the known precursor ion at two or more time steps of the targeted acquisition method. Ion guide 24 is adapted to provide an ion control field comprising a component for restraining movement of the product ions normal to guide axis 174 and comprising a component for controlling the movement of the product ions parallel to guide axis 174. The ion control field has a controllable potential profile along guide axis 174 of ion guide 24.

The profile is alternately switchable between either: i) a continuous mode where there is a continuous ejection of product ions from ion guide 24 to TOF mass analyzer 28 irrespective of the m/z values of the product ions; and, ii) a sequential mode where there is a sequential ejection of the product ions from ion guide 24 to TOF mass analyzer 28 according to the mass-to-charge ratios of the ions. The sequential mode is the Zeno pulsing mode and the continuous mode is the normal mode.

In some embodiments, the system may be operative to monitor a voltage of the TOF extraction pulse circuitry, and to detect initiation of a TOF extraction pulse based on the voltage exceeding a threshold voltage. By monitoring the voltage of the TOF extraction pulse circuitry the system may be operative to continuously provide TOF extraction pulses and to synchronize the transition between continuous mode and sequential mode to match the TOF extraction pulses.

For the sequential mode, the same ion energy is applied to the product ions over their travel through ion guide 24 to extraction region 56 irrespective of m/z value of the product ions. The product ions are sequentially released with the same ion energy from ion guide 24 to provide for arrival of product ions of substantially all released m/z values within the extraction region at substantially the same time.

The processor initially instructs ion guide 24 to eject the product ions of the known precursor ion using the sequential mode and instructs TOF mass analyzer 28 to measure the intensity of the at least one known product ion at each time step of the two or more time steps. The sequential or Zeno pulsing mode may then be dynamically switched to the continuous or normal pulsing mode. If the intensity of the at least one known product ion is increasing and is greater than a predefined sequential mode intensity threshold at a time step, the processor instructs ion guide 24 to switch to the continuous mode and instructs TOF mass analyzer 28 to measure the m/z of the at least one known product ion at each time step of the remaining two or more time steps.

In various embodiments, the processor determines that the intensity is increasing if the intensity is greater than an intensity of the at least one known product ion measured in sequential mode at the preceding time step.

In various embodiments, the continuous or normal pulsing mode may be dynamically switched to sequential or Zeno pulsing mode. If ion guide 24 is ejecting product ions in the continuous mode and the intensity of the at least one known product ion is decreasing and is less than a predefined continuous mode threshold at a time step, then the processor instructs ion guide 24 to switch back to the sequential mode and instructs TOF mass analyzer 28 to measure the intensity of the at least one known product ion at each time step of the remaining two or more time steps.

In various embodiments, the processor determines that the intensity is decreasing if the intensity is less than an intensity of the at least one known product ion measured in the continuous mode at the preceding time step.

In various embodiments, the processor instructs TOF mass analyzer 28 to apply the same repetition rate when ion guide 24 is in the sequential mode and when ion guide 24 is in the continuous mode. However, in sequential mode, at least one known product ion is recorded or analyzed at low frequency, although the TOF extraction pulse is applied at a high repetition rate.

In various embodiments, the processor instructs TOF mass analyzer 28 to measure the intensity of the at least one known product ion when ion guide 24 is in the sequential mode and when ion guide 24 is in the continuous mode using the same TOF mass analyzer calibration coefficients.

In various embodiments, the processor further normalizes the intensity to an intensity equivalently measured in the continuous mode, if the intensity is measured using the sequential mode. The processor can alternatively normalize the intensity to an intensity equivalently measured in the sequential mode, if the intensity is measured using the continuous mode.

Method for Dynamically Switching Between Zeno and Normal Modes

Figure 12:
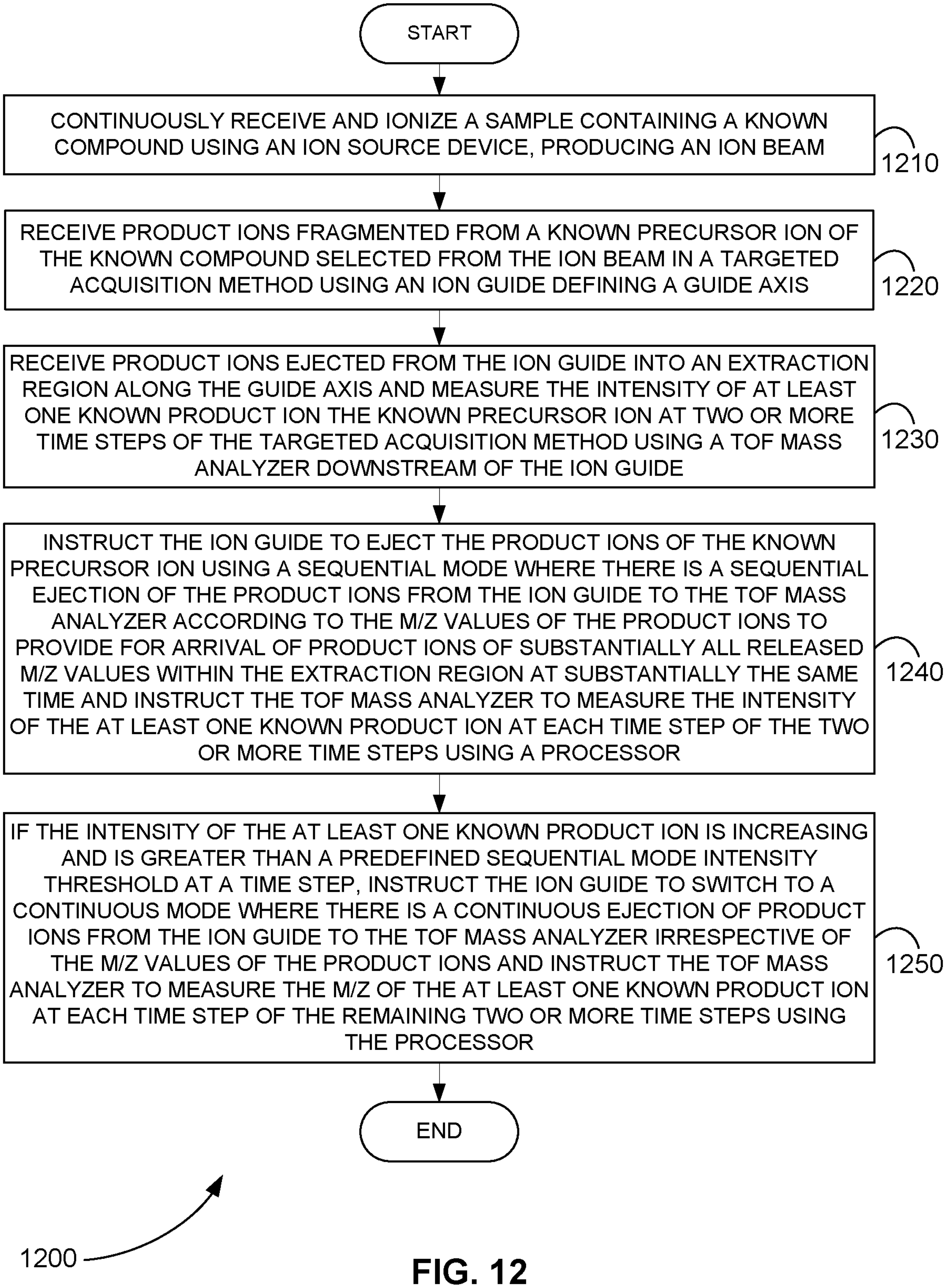
FIG. 12 is a flowchart showing a method for operating an ion guide and a TOF mass analyzer of a tandem mass spectrometer to dynamically concentrate or not concentrate product ions with different m/z values before injection into the TOF mass analyzer based on a previously measured intensity of a targeted product ion in a targeted acquisition method, in accordance with various embodiments.

FIG. 12 is a flowchart 1200 showing a method for dynamically switching between Zeno and normal modes. More generally, FIG. 12 is a flowchart 1200 showing a method for operating an ion guide and a TOF mass analyzer of a tandem mass spectrometer to dynamically concentrate or not concentrate product ions with different m/z values before injection into the TOF mass analyzer based on a previously measured intensity of a targeted product ion in a targeted acquisition method, in accordance with various embodiments.

In step 1210 of method 1200, a sample containing a known compound is continuously received and ionized using an ion source device, producing an ion beam.

In step 1220, product ions fragmented from a known precursor ion of the known compound selected from the ion beam in a targeted acquisition method are received using an ion guide defining a guide axis.

In step 1230, product ions ejected from the ion guide into an extraction region along the guide axis are received and the intensity of at least one known product ion of the known precursor ion is measured at two or more time steps of the targeted acquisition method using a TOF mass analyzer downstream of the ion guide. The ion guide is adapted to provide an ion control field comprising a component for restraining movement of the product ions normal to the guide axis and comprising a component for controlling the movement of the product ions parallel to the guide axis. The ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions. For the sequential mode, the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time.

In step 1240, the ion guide is instructed to eject the product ions of the known precursor ion using the sequential mode and the TOF mass analyzer is instructed to measure the intensity of the at least one known product ion at each time step of the two or more time steps using a processor.

In step 1250, if the intensity of the at least one known product ion is increasing and is greater than a predefined sequential mode intensity threshold at a time step, the ion guide to is instructed to switch to the continuous mode and the TOF mass analyzer is instructed to measure the m/z of the at least one known product ion at each time step of the remaining two or more time steps using the processor.

Computer Program Product for Dynamically Switching Between Zeno and Normal Modes In various embodiments, a computer program product includes a non-transitory tangible computer-readable storage medium whose contents include a program with instructions being executed on a processor so as to perform a method for dynamically switching between Zeno and normal pulsing modes. This method is performed by a system that includes one or more distinct software modules.

Figure 13:
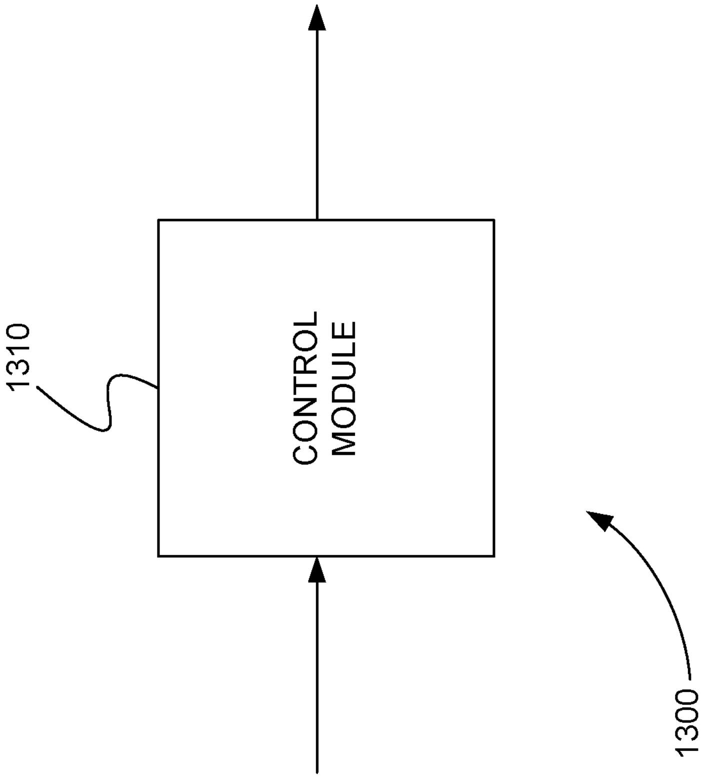
FIG. 13 is a schematic diagram of a system that includes one or more distinct software modules that performs a method for operating an ion guide and a TOF mass analyzer of a tandem mass spectrometer to dynamically concentrate or not concentrate product ions with different m/z values before injection into a TOF mass analyzer based on a previously measured intensity of a targeted product ion in a targeted acquisition method, in accordance with various embodiments.

More generally, FIG. 13 is a schematic diagram of a system 1300 that includes one or more distinct software modules that performs a method for operating an ion guide and a TOF mass analyzer of a tandem mass spectrometer to dynamically concentrate or not concentrate product ions with different m/z values before injection into a TOF mass analyzer based on a previously measured intensity of a targeted product ion in a targeted acquisition method, in accordance with various embodiments. System 1300 includes control module 1310.

Control module 1310 instructs an ion guide defining a guide axis to receive product ions fragmented from a known precursor ion of a known compound selected from an ion beam in a targeted acquisition method. An ion source device continuously receives and ionizes a sample containing the known compound, producing the ion beam.

Control module 1310 instructs a TOF mass analyzer downstream of the ion guide to receive product ions ejected from the ion guide into an extraction region of the TOF mass analyzer along the guide axis and measure the intensity of at least one known product ion of the known precursor ion at two or more time steps of the targeted acquisition method. The ion guide is adapted to provide an ion control field comprising a component for restraining movement of the product ions normal to the guide axis and comprising a component for controlling the movement of the product ions parallel to the guide axis.

The ion control field is dynamically switchable between normal and Zeno pulsing modes. The ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions. The continuous mode is the normal pulsing mode and the sequential mode is the Zeno pulsing mode. For the sequential mode, the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time.

Control module 1310 instructs the ion guide to eject the product ions of the known precursor ion using the sequential mode and instructing the TOF mass analyzer to measure the intensity of the at least one known product ion at each time step of the two or more time steps. If the intensity of the at least one known product ion is increasing and is greater than a predefined sequential mode intensity threshold at a time step, control module 1310 instructs the ion guide to switch to the continuous mode and instructing the TOF mass analyzer to measure the m/z of the at least one known product ion at each time step of the remaining two or more time steps.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for operating an ion guide and a time-of-flight (TOF) mass analyzer of a tandem mass spectrometer to dynamically concentrate or not concentrate product ions with different mass-to-charge ratio (m/z) values before injection into the TOF mass analyzer based on a previously measured intensity of a targeted product ion in a targeted acquisition method, comprising:

an ion source device that continuously receives and ionizes a sample containing a known compound, producing an ion beam;

an ion guide defining a guide axis that receives product ions fragmented from a known precursor ion of the known compound selected from the ion beam in a targeted acquisition method;

a TOF mass analyzer downstream of the ion guide that receives product ions ejected from the ion guide into an extraction region of the TOF mass analyzer along the guide axis and measures the intensity of at least one known product ion of the known precursor ion at two or more time steps of the targeted acquisition method, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time; and a processor in communication with the ion guide and the TOF mass analyzer that initially instructs the ion guide to eject the product ions of the known precursor ion using the sequential mode and instructs the TOF mass analyzer to measure the intensity of the at least one known product ion at each time step of the two or more time steps, if the intensity of the at least one known product ion is increasing and is greater than a predefined sequential mode intensity threshold at a time step and if there are remaining time steps, instructs the ion guide to switch to the continuous mode and instructs the TOF mass analyzer to measure the intensity of the at least one known product ion at each time step of the remaining time steps to prevent saturation of the intensity of the at least one known product ion.

2. The system of claim 1, wherein the processor determines that the intensity is increasing if the intensity is greater than an intensity of the at least one known product ion measured in sequential mode at the preceding time step.

3. The system of claim 1, wherein further if the ion guide is ejecting product ions in the continuous mode and the intensity of the at least one known product ion is decreasing and is less than a predefined continuous mode threshold at a time step and if there are remaining time steps, then the processor instructs the ion guide to switch back to the sequential mode and instructs the TOF mass analyzer to measure the intensity of the at least one known product ion at each time step of the remaining time steps.

4. The system of claim 3, wherein the processor determines that the intensity is decreasing if the intensity is less than an intensity of the at least one known product ion measured in the continuous mode at the preceding time step.

5. The system of claim 1, wherein the processor instructs the TOF mass analyzer to apply the same repetition rate when the ion guide is in the sequential mode and when the ion guide is in the continuous mode.

6. The system of claim 1, wherein the processor instructs the TOF mass analyzer to measure the intensity of the at least one known product ion when the ion guide is in the sequential mode and when the ion guide is in the continuous mode using the same TOF mass analyzer calibration coefficients.

7. The system of claim 1, wherein the processor further normalizes the intensity to an intensity equivalently measured in the continuous mode, if the intensity is measured using the sequential mode.

8. The system of claim 1, wherein the processor further normalizes the intensity to an intensity equivalently measured in the sequential mode, if the intensity is measured using the continuous mode.

9. A method for operating an ion guide and a time-of-flight (TOF) mass analyzer of a tandem mass spectrometer to dynamically concentrate or not concentrate product ions with different mass-to-charge ratio (m/z) values before injection into the TOF mass analyzer based on a previously measured intensity of a targeted product ion in a targeted acquisition method, comprising:

continuously receiving and ionizing a sample containing a known compound using an ion source device, producing an ion beam;

receiving product ions fragmented from a known precursor ion of the known compound selected from the ion beam in a targeted acquisition method using an ion guide defining a guide axis;

receiving product ions ejected from the ion guide into an extraction region along the guide axis and measuring the intensity of at least one known product ion of the known precursor ion at two or more time steps of the targeted acquisition method using a TOF mass analyzer downstream of the ion guide, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time;

instructing the ion guide to eject the product ions of the known precursor ion using the sequential mode and instructing the TOF mass analyzer to measure the intensity of the at least one known product ion at each time step of the two or more time steps using a processor; and instructing the ion guide during remaining time steps, based on the measured intensity of the at least one known product ion determined to be increasing and being greater than a predefined sequential mode intensity threshold at a time step of remaining time steps, to switch to the continuous mode and instructing the TOF mass analyzer to measure the intensity of the at least one known product ion at each time step of the remaining time steps to prevent saturation of the intensity of the at least one known product ion using the processor.

10. The method of claim 9, wherein the intensity of the at least one known product ion is determined to be increasing based on a determination that the intensity of the at least one known product ion is greater than an intensity of the at least one known product ion measured in sequential mode at a preceding time step.

11. The method of claim 9, further comprising, instructing the ion guide ejecting product ions in the continuous mode during the remaining time steps, based on the measured intensity of the at least one known product ion determined to be decreasing and being less than a predefined continuous mode threshold at another time step of the remaining time steps, to switch back to the sequential mode and instructing the TOF mass analyzer to measure the intensity of the at least one known product ion at each time step of the remaining time steps using the processor.

12. The method of claim 11, wherein the intensity of the at least one known product ion is determined to be decreasing based on a determination that the intensity of the at least one known product ion is less than an intensity of the at least one known product ion measured in the continuous mode at the preceding time step.

13. The method of claim 9, further comprising instructing the TOF mass analyzer to apply the same repetition rate when the ion guide is in the sequential mode and when the ion guide is in the continuous mode using the processor.

14. The method of claim 9, further comprising instructing the TOF mass analyzer to measure the intensity of the at least one known product ion when the ion guide is in the sequential mode and when the ion guide is in the continuous mode using the same TOF mass analyzer calibration coefficients using the processor.

15. The method of claim 9, further comprising normalizing the intensity to an intensity equivalently measured in the continuous mode, if the intensity is measured using the sequential mode.

16. The method of claim 9, further comprising normalizing the intensity measured using the continuous mode to an intensity equivalently measured in the sequential mode.

17. A computer program product, comprising a non-transitory tangible computer-readable storage medium whose contents include a program with instructions being executed on a processor so as to perform a method for operating an ion guide and a time-of-flight (TOF) mass analyzer of a tandem mass spectrometer to dynamically concentrate or not concentrate product ions with different mass-to-charge ratio (m/z) values before injection into the TOF mass analyzer based on a previously measured intensity of a targeted product ion in a targeted acquisition method, comprising:

providing a system, wherein the system comprises one or more distinct software modules, and wherein the distinct software modules comprise a control module;

instructing an ion guide defining a guide axis to receive product ions fragmented from a known precursor ion of a known compound selected from an ion beam in a targeted acquisition method using the control module, wherein an ion source device continuously receives and ionizes a sample containing the known compound, producing the ion beam;

instructing a TOF mass analyzer downstream of the ion guide to receive product ions ejected from the ion guide into an extraction region of the TOF mass analyzer along the guide axis and measure the intensity of at least one known product ion of the known precursor ion at two or more time steps of the targeted acquisition method using the control module, wherein the ion guide is adapted to provide an ion control field comprising a component for restraining movement of the product ions normal to the guide axis and comprising a component for controlling the movement of the product ions parallel to the guide axis, wherein the ion control field has a controllable potential profile along the guide axis of the ion guide, the profile being alternately switchable to a continuous mode where there is a continuous ejection of product ions from the ion guide to the TOF mass analyzer irrespective of the m/z values of the product ions or to a sequential mode where there is a sequential ejection of the product ions from the ion guide to the TOF mass analyzer according to the m/z values of the product ions, and wherein for the sequential mode the same ion energy is applied to the product ions over their travel through the ion guide to the extraction region irrespective of m/z value of the product ions and the product ions are sequentially released with the same ion energy from the ion guide to provide for arrival of product ions of substantially all released m/z values within the extraction region at substantially the same time;

instructing the ion guide to eject the product ions of the known precursor ion using the sequential mode and instructing the TOF mass analyzer to measure the intensity of the at least one known product ion at each time step of the two or more time steps using the control module; and if the intensity of the at least one known product ion is increasing and is greater than a predefined sequential mode intensity threshold at a time step and if there are remaining time steps, instructing the ion guide to switch to the continuous mode and instructing the TOF mass analyzer to measure the intensity of the at least one known product ion at each time step of the remaining time steps to prevent saturation of the intensity of the at least one known product ion using the control module.

* * * * *